US007852638B2

(12) United States Patent
Kondo et al.

(10) Patent No.: US 7,852,638 B2
(45) Date of Patent: Dec. 14, 2010

(54) FRAME, ELECTRONIC DEVICE, IMAGE FORMING APPARATUS, AND FRAME ASSEMBLY METHOD

(75) Inventors: Kazuyoshi Kondo, Osaka (JP); Nobuhiko Kita, Osaka (JP); Ryoh Idehara, Hyogo (JP); Yuusuke Furuichi, Osaka (JP); Tadashi Okano, Ibaraki (JP); Genta Hagiwara, Ibaraki (JP); Kaoru Tada, Ibaraki (JP)

(73) Assignee: Ricoh Company, Ltd., Tokyo (JP)

(*) Notice: Subject to any disclaimer, the term of this patent is extended or adjusted under 35 U.S.C. 154(b) by 845 days.

(21) Appl. No.: 11/812,790

(22) Filed: Jun. 21, 2007

(65) Prior Publication Data

US 2008/0007935 A1 Jan. 10, 2008

(30) Foreign Application Priority Data

Jun. 22, 2006 (JP) ............................ 2006-172434
May 16, 2007 (JP) ............................ 2007-130493

(51) Int. Cl.
*H02B 1/01* (2006.01)

(52) U.S. Cl. ........................ 361/829; 361/807; 361/810

(58) Field of Classification Search ................. 361/829, 361/807, 810, 752, 790, 797, 800
See application file for complete search history.

(56) References Cited

U.S. PATENT DOCUMENTS 5,195,836 A * 3/1993 Longust et al. ............. 400/354
5,570,962 A * 11/1996 Suzuki et al. .......... 400/120.16
5,775,825 A * 7/1998 Hong et al. ................. 400/693
6,385,055 B1 * 5/2002 Kramer et al. .............. 361/816
6,826,058 B1 * 11/2004 Cafferty et al. ............. 361/825
6,970,361 B2 * 11/2005 Jansen ........................ 361/759
2007/0110473 A1 5/2007 Kondo et al.

FOREIGN PATENT DOCUMENTS

JP 61-131833 6/1986
JP 4-85445 7/1992
JP 2002-169353 6/2002
JP 2003-270898 9/2003
JP 2004-029606 1/2004
JP 2004-122444 4/2004
JP 2004-302194 10/2004

OTHER PUBLICATIONS

Chinese Office Action dated Mar. 20, 2009 with English translation.

* cited by examiner

*Primary Examiner*—Hung S Bui
(74) *Attorney, Agent, or Firm*—Harness, Dickey & Pierce, PLC

(57) ABSTRACT

A frame constitutes an apparatus, and includes a first side plate, a second side plate that faces the first side plate, and a connecting member between the first and second side plates. The connecting member includes a first-side connecting portion and a second-side connecting portion. The first-side connecting portion is connected to the first side plate so that the first side plate does not move with respect to the connecting member. The second-side connecting portion includes a first connecting portion and a second connecting portion. The second side plate moves with respect to the connecting member on a second-connecting-portion side with the first connecting portion as a center. The first and second side plates are attached with a cover member that is openable and closable from the front side of the apparatus.

15 Claims, 17 Drawing Sheets

FRAME, ELECTRONIC DEVICE, IMAGE FORMING APPARATUS, AND FRAME ASSEMBLY METHOD

CROSS-REFERENCE TO RELATED APPLICATIONS

The present application claims priority to and incorporates by reference the entire contents of Japanese priority document, 2006-172434 filed in Japan on Jun. 22, 2006 and 2007-130493 filed in Japan on May 16, 2007.

BACKGROUND OF THE INVENTION

1. Field of the Invention

The present invention relates to a technology for positioning various types of functional components and devices between side plates in a frame.

2. Description of the Related Art

An image forming apparatus is one of devices that incorporate various functional components and devices in a frame structure including side plates disposed oppositely.

A full-color printer or the like that can form an image of not only a single color but a plurality of colors is widely used recently.

In the full-color printer, two systems are known. One of them is such that color images formed in a plurality of imaging units are sequentially transferred to a recording medium such as a recording sheet. The other one is such that, as a primary transfer process, images of different colors are sequentially transferred to an intermediate transfer member to be superposed and, as a secondary transfer process, the superposed images are collectively transferred to a recording medium that is conveyed to the intermediate transfer member. Reference may be had to, for example, Japanese Patent Application Laid-Open No. 2004-302194.

When images of different colors are transferred to be superposed on each other, it is necessary to prevent occurrence of any abnormal image due to color shift by improving transfer positional accuracy of color images.

One of factors affecting on the transfer positional accuracy is accuracy as to whether components of imaging units used to form images are accurately fixed in place. More specifically, if image carriers are not arranged in parallel to each other between the imaging units, or if light-path lengths of scanning lights are different from one another in a main scanning direction, then transfer positions deviate from one another between the imaging units. The deviation causes a transfer start position of an image to be different from the other ones when images are superposed, which may cause color shift to occur.

For example, Japanese Patent Application Laid-Open Nos. 2003-270898, and 2002-169353 disclose a structure to prevent degradation of fixing accuracy of devices between imaging units is such that a stay is provided laterally between side plates of a frame structure which is used to support these devices. Japanese Patent Application Laid-Open No. 2004-302194 discloses another structure such that a positional relationship between side plates and a stay is determined by using a jig and then the devices are fixed in place.

Japanese Utility Model Application Laid-Open No. H04-85445 discloses a structure to fix the stay laterally provided between the side plates is such that a plurality of convex portions is provided in the stay side and a plurality of concave portions is provided in the side plates at positions corresponding to the convex portions so that the convex portions can be fitted in the concave portions. One of the convex portions and the corresponding one of the concave portions are set as reference, and errors in the positions and the sizes of the other convex portions and concave portions are suppressed to values in their tolerance ranges respectively.

In a structure to prevent a tilt of side plates easily occurring when an external force affects the side plates with the stay arranged therebetween as described in Japanese Patent Application Laid-Open Nos. 2003-270898 and 2002-169353, the rigidity of the side plates can be enhanced by reinforcing the side plates using the stay. To enhance the rigidity of the side plates, the rigidity against the external force in particular, the rigidity of the side plates themselves are required. Hence, a sheet metal material, such as SECC (Steel, Electrogalvanized, ColdRolled, Coil) that is comparatively easy to ensure the rigidity, is often used for the side plates.

When the side plates are made of the sheet metal material, however, the weight of the frame structure increases, which may cause the entire image forming apparatus to increase its weight.

For this reason, a resin molding may be used for support structural components such as side plates to reduce the weight of the frame structure and the cost thereof.

When the resin molding is used, however, it is difficult for the resin molding, which is smaller than the sheet metal material, to ensure the rigidity. Hence, it can be thought of that a sheet metal component is integrally attached to part of the resin molding to ensure the rigidity at the fixed position of each device while its weight is reduced.

When this structure is used, a mold becomes complicated because the mold needs to be made allowing for incorporating the sheet metal component therein, and it is therefore difficult to obtain a complicated shape. In addition to this, when the sheet metal material is fixed to the part thereof, using the sheet metal material causes the increase of the material cost and the assembly cost as compared with the case where only the resin molding is used.

At the same time, the device is quite often fixed between the side plates by fastening. Therefore, positional accuracy between the devices cannot sometimes be ensured caused by displacement due to the fastening upon the fixing of the devices thereto although the rigidity of the side plates is ensured. This problem may also arise when supporting portions are formed by the resin molding. Even if the resin molding allows reduction of the weight of the device, upsizing of the components, and reduction of additional components due to integral molding, the displacement of the fixed position of the device as the resin molding may cause positions of images superposed on each other to be displaced.

When the structure disclosed in Japanese Utility Model Application Laid-Open No. H04-85445 is used, in particular, deformation of the stay occurring due to the external force affected after the stay is fixed can not be prevented even if the displacement occurring upon fixing of the device can be resolved.

If the stay provided between the side plates is distorted due to displacement at a fastened portion upon fixing of the device or due to an external force affecting the device after the device is fixed, the external force is easily concentrated on the fastened portion between the device and the side plates. This concentration may cause displacement of the fixed device.

Particularly, as described in Japanese Patent Application Laid-Open Nos. 2003-270898 and 2002-169353, when the stay is integrated to the side plates by fastening, the positional relationship between the side plates is restricted by the positional relationship between the side plates and the stay, and the positional relationship between the side plates and a device fixed thereto is thereby restricted. Because of the restriction, the fixed position of the device may remain displaced as it is. Besides, as described in Japanese Patent Application Laid-Open No. 2004-302194, when the side plates are to be positioned by using the jig, the stay, of which positional relationship with the side plates is determined by the jig, is distorted due to the external force after the jig is removed, which may cause displacement between the side plates.

SUMMARY OF THE INVENTION

It is an object of the present invention to at least partially solve the problems in the conventional technology.

According to an aspect of the present invention, a frame that constitutes an apparatus includes a first side plate, a second side plate that faces the first side plate, and a connecting member that is located between the first side plate and the second side plate, and that is supported by the first side plate and the second side plate at a first side and a second side, respectively. The first side plate and the second side plate are configured to be attached with a component of the apparatus. The connecting member includes a first-side connecting portion on the first side and a second-side connecting portion on the second side. The first-side connecting portion is connected to the first side plate so that the first side plate does not move with respect to the connecting member. The second-side connecting portion includes a first connecting portion and a second connecting portion. The second side plate moves with respect to the connecting member on a second-connecting-portion side with the first connecting portion as a center. The first side plate and the second side plate are attached with a cover member that is selectably positionable between an open position and a closed position.

According to another aspect of the present invention, an image forming apparatus includes a frame that constitutes an apparatus. The frame includes a first side plate, a second side plate that faces the first side plate, and a connecting member that is located between the first side plate and the second side plate, and that is supported by the first side plate and the second side plate at a first side and a second side, respectively. The first side plate and the second side plate are configured to be attached with a component of the apparatus. The connecting member includes a first-side connecting portion on the first side and a second-side connecting portion on the second side. The first-side connecting portion is connected to the first side plate so that the first side plate does not move with respect to the connecting member. The second-side connecting portion includes a first connecting portion and a second connecting portion. The second side plate moves with respect to the connecting member on a second-connecting-portion side with the first connecting portion as a center. The first side plate and the second side plate are attached with a cover member that is selectably positionable between an open position and a closed position.

According to still another aspect of the present invention, a frame assembly method for assembling a frame that constitutes an apparatus and includes side plates each having a positioning and holding member on a surface facing another side plate to position and hold a component of the apparatus between the side plates, includes fitting a connecting member between the side plates so that the connecting member is supported by the side plates, fixing one side of the connecting member to one of the side plates, attaching the component to the positioning and holding member of each of the side plates which are connected to each other in a loose-fitting state, and fastening and fixing the connecting member to the side plates.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
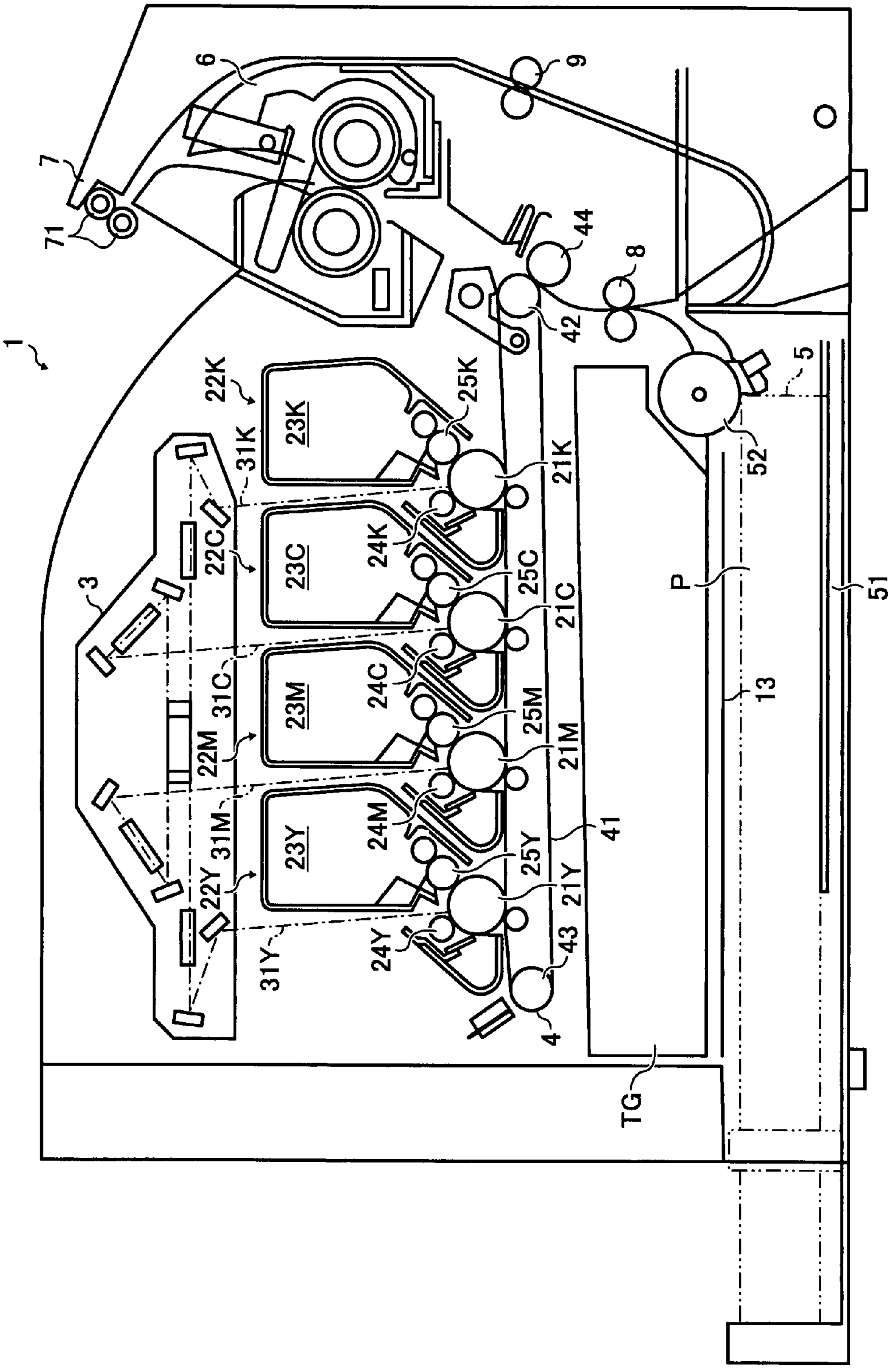
FIG. 1 is an example of an image forming apparatus using a frame according to an embodiment of the present invention.

FIG. 1 is a schematic diagram of an image forming apparatus as one of electronic devices using a frame according to an embodiment of the present invention. The image forming apparatus shown in FIG. 1 is a color laser printer (hereinafter, “laser printer”) 1 in which imaging units that form images of a plurality of colors due to writing with laser beams are arranged. However, the image forming apparatus can also be applied to a copier, a facsimile machine, a printer, and the like.

The laser printer 1 includes image carriers (photosensitive drums) 21K, 21C, 21M, and 21Y, developing units, and an intermediate transfer member (or an intermediate transfer belt 41, a conveyor belt for a transfer material P, and a photosensitive belt). The image carriers 21K, 21C, 21M, and 21Y rotate at each constant speed for respective colors of black (K), cyan (C), magenta (M), and yellow (Y). The developing units include color developing devices 22K, 22C, 22M, and 22Y. The intermediate transfer member holds images of the colors which are developed by the developing units and are transferred thereto in the primary transfer process so that color images are superposed on each other, and transfers a superposed color image to the transfer material P fed from a sheet feeder 5 in the secondary transfer process.

The transfer material P with the color image thereon is conveyed to a fixing unit 6, where the color image is fixed on the transfer material P. Sheet discharge rollers 71 discharge the transfer material P to a sheet discharge portion on the top surface of the apparatus. It is noted that each of the color developing devices and corresponding one of the image carriers for the four colors are integrally configured into one unit for each color, and respective units are discretely and detachably attached to a printer body.

The image carriers 21K, 21C, 21M, and 21Y are integrally configured with the developing devices 22K, 22C, 22M, and 22Y and toner containers 23K, 23C, 23M, and 23Y which are incorporated in the developing units, respectively. The integrally configured developing units are detachably held by the printer body so that each of the developing units is easily replaceable according to toner consumption.

Each of the image carriers 21K, 21C, 21M, and 21Y is made by applying an organic photoconductive layer to the outside of an aluminum cylinder, and is rotatably supported to each housing of process cartridges explained later through flanges, bearings, and shafts (not shown) coaxially arranged at both edges of each of the image carriers 21K, 21C, 21M, and 21Y. The process cartridges include the developing devices 22K, 22C, 22M, and 22Y respectively. The image carriers 21K, 21C, 21M, and 21Y and the shafts are electrically conducted.

A drive transfer mechanism (e.g., helical gear) (not shown) is coaxially provided on each of the image carriers 21K, 21C, 21M, and 21Y, and is rotated by a drive unit (not shown).

Charging units 24K, 24C, 24M, and 24Y uniformly charge the surfaces of the image carriers 21K, 21C, 21M, and 21Y, respectively.

Writing to each image carrier is performed by corresponding one of laser diode (LD) beams for the colors (31K, 31C, 31M, and 31Y) emitted from a writing exposure device 3, and the surfaces of the image carriers 21K, 21C, 21M, and 21Y are selectively radiated with laser beams respectively, and electrostatic latent images are thereby formed on the image carriers, respectively.

The developing units are formed with four developing devices 22K, 22C, 22M, and 22Y which allow development of the colors of black, cyan, magenta, and yellow to visualize the electrostatic latent images. The four-color developing devices 22K, 22C, 22M, and 22Y are arranged at locations where developing rollers 25K, 25C, 25M, and 25Y facing the image carriers 21K, 21C, 21M, and 21Y respectively come in contact with the image carriers 21K, 21C, 21M, and 21Y while the developing rollers are rotating, to form visual images on the image carriers 21K, 21C, 21M, and 21Y with the color toners, respectively.

In the imaging units for respective colors of the laser printer 1, the process cartridges include, for image formation for each color, the image carriers 21K, 21C, 21M, and 21Y, the developing devices 22K, 22C, 22M, and 22Y that form corresponding images, the charging units 24K, 24C, 24M, and 24Y, and cleaning devices for the image carriers 21K, 21C, 21M, and 21Y after toner images are transferred.

The intermediate transfer member is made to rotate to multiply-transfer thereto the visualized toner images on the image carriers 21K, 21C, 21M, and 21Y during color image formation. The intermediate transfer member includes the intermediate transfer belt 41, a drive roller 42 for drive transfer, and a tension roller 43 for stretching the intermediate transfer belt 41 so as to keep the tension thereof. The toner images formed on the image carriers 21K, 21C, 21M, and 21Y are multiply-transferred to the intermediate transfer belt 41. The multiply-transferred toner images are collectively transferred from the intermediate transfer belt 41 to the transfer material P at a secondary transfer unit 44.

The laser printer 1 further includes the sheet feeder 5 that feeds a transfer material P from a sheet-feed cassette 51, a conveyor device 8 that conveys the transfer material P, the fixing unit 6 that fixes the collectively transferred color images on the transfer material P, a sheet discharge unit 7 that conveys the transfer material P with the image formation completed thereon to a sheet discharge port provided on the top surface of the printer, and a duplex printing unit 9 used to form images on both sides of the transfer material P.

In the laser printer 1 configured in the above manner, its printer body is structured by a housing with the frame combined with each other. Incorporated in the frame structure are various devices and members used for the imaging units, and also the intermediate transfer member corresponding to the image carriers in the imaging units.

FIGS. 2 to 6 are schematic diagrams for explaining a structure of the frame. It is noted that the frame used in the following explanation is a synonym of a frame structure or a framework, and indicates the framework portion of the housing in the image forming apparatus in the following explanation, but the frame is not limited to this meaning in the present invention. The frame therefore corresponds to electronic devices in general or any other structure in which electric components are incorporated and used in the same manner as the image forming apparatus. The frame is made of metal or resin.

Figure 2:
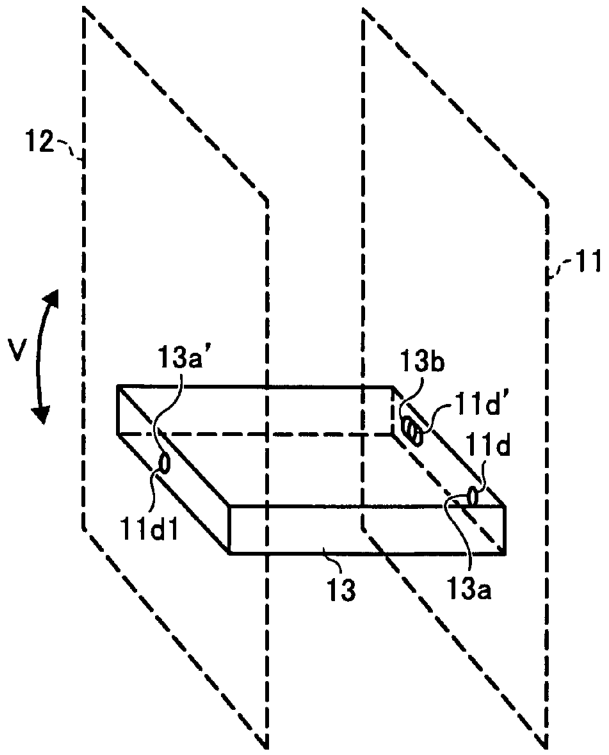
FIG. 2 is a schematic diagram for explaining a structure of the frame.

In FIG. 2, a main portion of the frame is structured in such a manner that a device or a member used for the imaging unit is attached between side plates 11 and 12 which face each other and have a mutually set relationship.

The side plates 11 and 12 are connected to each other by using a stay member 13 which is a connecting member made of a plate laterally provided between the opposite faces thereof.

As for the stay member 13, a direction perpendicular to an upright direction (vertical direction) of the side plates 11 and 12 in the same plane is determined as a front-to-rear direction of the stay member 13, and end faces thereof in its lateral direction with respect to the front-to-rear direction are bent to form piece portions, and the end faces of the piece portions are fastened and supported by the side plates 11 and 12.

Figure 17:
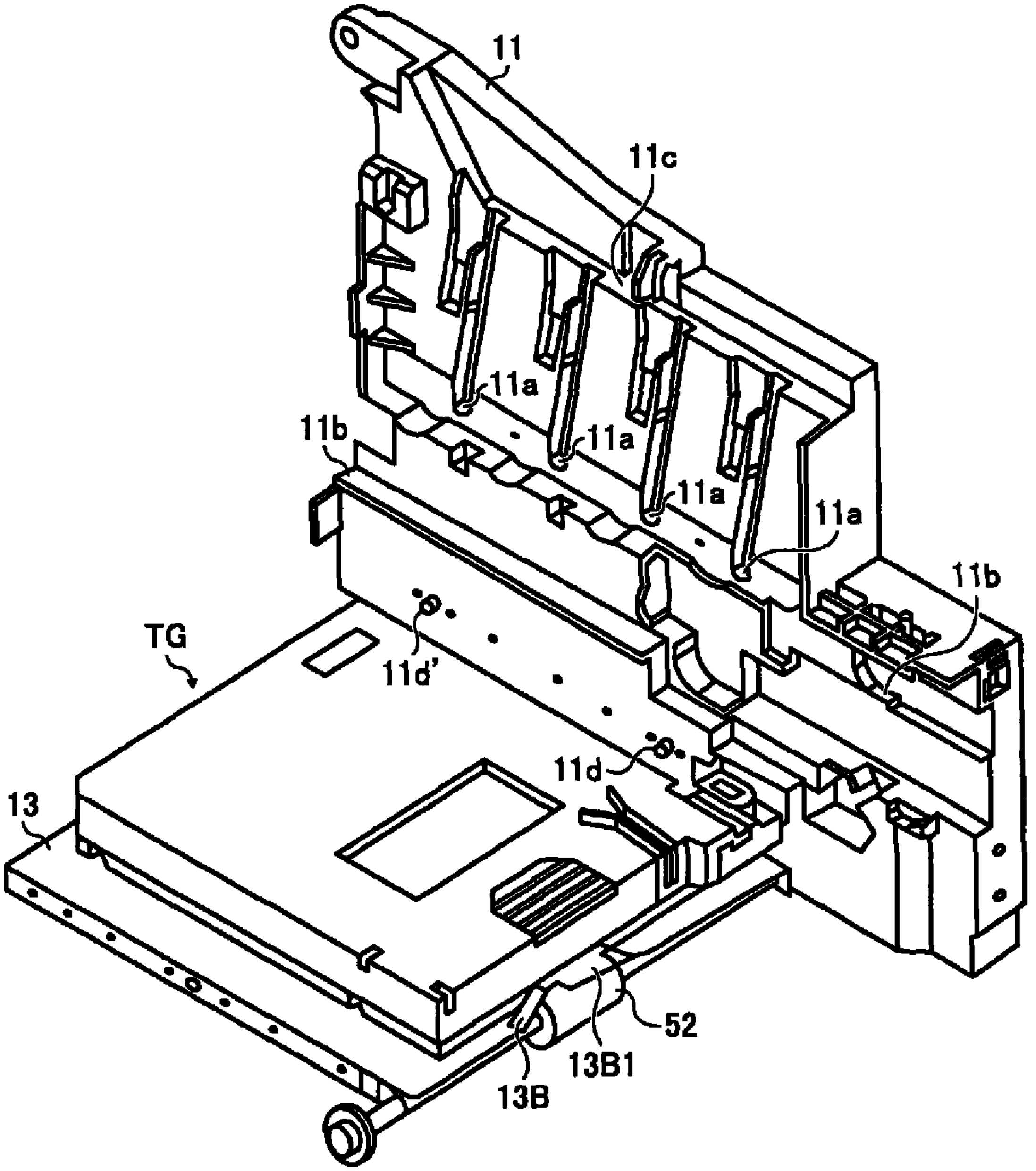
FIG. 17 is a perspective view of the partially modified example shown in FIG. 16.

Provided on the opposite faces of the side plates 11 and 12 to which the stay member 13 is integrally provided are positioning/holding portions for devices or members as shown in FIGS. 8 to 14. More specifically, the positioning/holding portions are image-carrier supporting portions 11*a* and 12*a*, transfer-device supporting portions 11*b* and 12*b*, writing-exposure-device supporting portions 11*c* and 12*c*, and supporting portions for some other devices, which are used in the imaging units, respectively. FIG. 17 represents a positional relationship between the stay member 13 and a waste toner tank TG located above the stay member 13.

The supporting portions are structured by using grooves for fitting provided in positions in the side plates 11 and 12 where objects to be supported can be positioned. The formation positions are set so that heights from respective bottoms of the side plates 11 and 12 are the same as each other for each of the objects to be supported, and are provided in symmetrical positions, in the lateral direction of the stay member 13, with respect to the front-to-rear direction.

As shown in FIG. 2, the stay member 13 has its right end face fixed to the side plate 11 on the right side, and has rotational freedom as indicated by arrow V with respect to the side plate 12 on the left side so that the left end face of the stay member 13 is movable upward and downward. In other words, the side plate 12 is rotatable with respect to the stay member 13. It is noted that each arrow V shown in FIGS. 4A, 7A, 11, and 12 indicates the same function as above.

In FIG. 2, a front-side convex portion 11*d* and a rear-side convex portion 11*d*', which are first and second-convex portions, respectively, are provided on the side plate 11 facing one end face in the lateral direction of the stay member 13 along the front-to-rear direction, to form connecting parts between the stay member 13 and the side plate 11. A front-side concave portion 13*a* and a rear-side concave portion 13*b* are provided on the end face of the stay member 13 corresponding to the front-side and rear-side convex portions 11*d* and 11*d*', and the convex portions are fixed in the corresponding concave portions to be connected to each other.

A single convex portion 11*d*1 is provided on the surface of the side plate 12 that faces the other end face of the stay member 13 at an almost center between the arranged positions of the front-side and rear-side convex portions 11*d* and 11*d*' in the front-to-rear direction with the same height as the heights from the bottom of the stay member 13 to the convex portions.

The single convex portion 11*d*1, explained later, does not move upward and downward with respect to a single concave portion 13*a*' provided on the stay member 13 but is used as a rotation fulcrum when the side plate 12 is made to rotate.

The front-side convex portion 11*d* and the single convex portion 11*d*1 are the same in size, and the concave portions 13*a* and 13*a*' on the stay member 13, in which these convex portions are fitted, have almost the same size as that of the convex portions. In other words, the concave portions have almost no room other than each fitting margin for the front-side convex portion 11*d* and the single convex portion 11*d*1. Thus, the convex portions do not shift when they are fitted in the corresponding concave portions.

On the other hand, the size of the rear-side convex portion 11*d*' on the side plate 11 is not the same as that of the concave portion 13*b* on the stay member 13 in which the rear-side convex portion 11*d*' is fitted. More specifically, the concave portion 13*b* is formed larger than the rear-side convex portion 11*d*'. In the example of FIG. 2, the concave portion 13*b* is an elongated hole in which its size i.e., the fitting margin in the front-to-rear direction, is made larger than the outer diameter of the convex portion 11*d*'. The fitting margin is provided in the front-to-rear direction of the side plate 11, and thus, when the side plate 11 and the stay member 13 are to be assembled before the side plate 12 and the stay member 13 are assembled, the rear-side convex portion 11*d*' on the side plate 11 can be adjusted so as to be fitted in the concave portion 13*b* on the stay member 13.

Therefore, when the side plates 11 and 12 are made to face each other by a surface plate and a jig upon fixing of the stay member 13 to the side plate 11, the side plate 11 and the stay member 13 are fixed while the side plate 12 pivots singly in the V direction. That is, the side plate 12 pivots with respect to a combined member of the stay member 13 and the side plate 11, or the combined member pivots with respect to the side plate 12. This is because each of a pair of the rear-side convex portion 11*d*' and the concave portion 13*b* and a pair of the front-side convex portion 11*d* and the concave portion 13*a* has no backlash in its vertical direction. As a result, even if the side plate 11 and the stay member 13 are fixed to each other, the side plate 12 pivots to enable parallelism between the side plate 11 and the side plate 12 to be adjusted. This adjustment allows prevention of the parallelism between the side plates from being inclined to the stay member 13.

The single convex portion 11*d*1, which is a third convex portion located on the side plate 12, is rotatably fitted in the concave portion 13*a*' of the stay member 13. Thus, even if the parallelism between the side plates 11 and 12 cannot be maintained, the both portions can be fastened using a screw while the stay member 13 can be kept to its natural posture by using the assembly state at the fitting portion and the pivoting portion, and there is no need to adjust the posture of the stay member 13 to a horizontal state by an operation such as forcefully distorting the stay member 13. It is noted that a diameter of a screw hole on the side plate is set so as to respond to the change of the position of the stay member 13.

The results enable the stay member 13 to change its position so as to adjust its fastened positions with respect to the fastened positions on the side plates 11 and 12 in which their facing relationship such as the parallelism is previously defined. Therefore, it is possible to connect the stay member 13 to the side plates 11 and 12 without losing the relationship between the side plates 11 and 12 in which the previously defined facing relationship is maintained. Alternatively, it is possible to adjust the parallelism by pivoting the side plate 12 with respect to the stay member 13 and the side plate 11 which are fixed to each other.

In other words, a device is mounted on the side plates 11 and 12 by using any ones of the supporting portions 11*a* and 12*a*, 11*b* and 12*b*, and 11*c* and 12*c* for the devices or members. When the device is mounted thereon, a torsional angle of the stay member 13 with respect to the side plates 11 and 12 can be restricted based on the facing relationship between the side plates without depending on the accuracy of the stay member 13.

Accordingly, even if an error occurs between the fastened positions of the stay member 13 with respect to the side plates 11 and 12, the torsional angles of the side plates 11 and 12 can be adjusted. Therefore, the stay member 13 is not used as reference component, but the side plates 11 and 12 are used as reference components of which facing relationship is previously defined, to fix the stay member 13 to the side plates 11 and 12. Further, it is possible to prevent occurrence of an event such that the facing relationship between the side plates is lost when the fastened positions on the stay member 13 are used as the reference. In other words, it is possible to obtain a state where the positions of the side plates 11 and 12 are not restricted by the stay member 13 upon connection between the side plates 11 and 12 and the stay member 13.

Figure 3A:
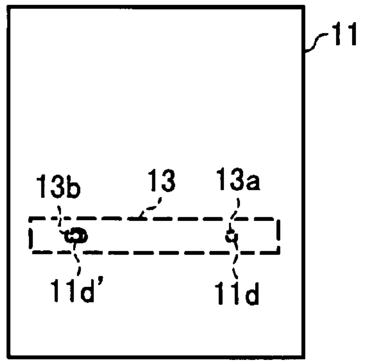
FIG. 3A is a side view of one of side plates shown in FIG. 2.
Figure 3B:
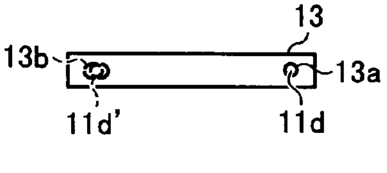
FIG. 3B is a schematic diagram of a contact surface of a stay member shown in FIG. 3A.
Figure 4A:
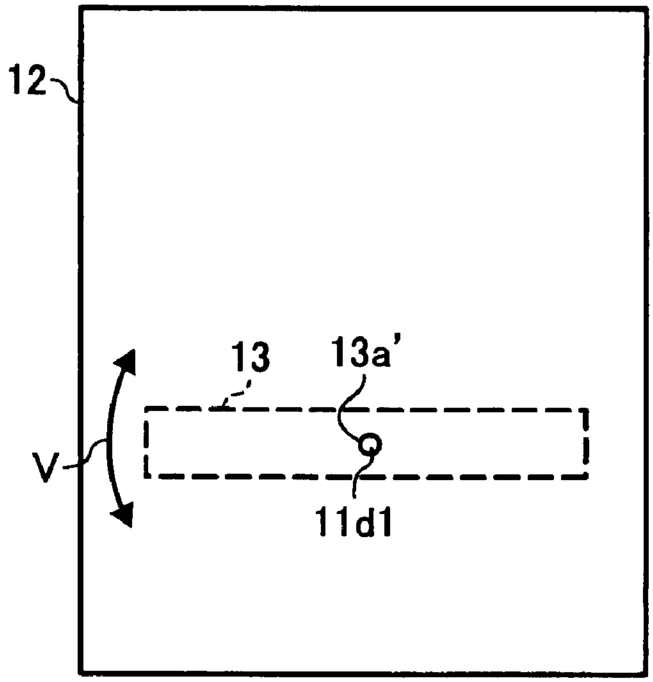
FIG. 4A is a side view of the other one of the side plates.
Figure 4B:
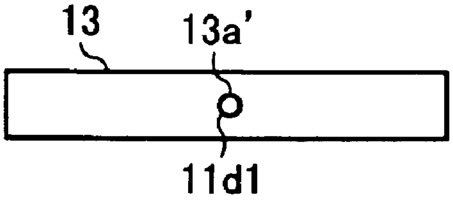
FIG. 4B is a schematic diagram of a contact surface of a stay member shown in FIG. 4A.

FIG. 3A depicts how the front-side convex portion 11*d* and the rear-side convex portion 11*d*' are fitted in the concave portions 13*a* and 13*b* on the stay member 13, respectively, viewed from the outside of the side plate 11. FIG. 4A depicts how the single convex portion 11*d*1 is fitted in the concave portion 13*a*' on the stay member 13, viewed from the outside of the side plate 12. FIG. 3B depicts a contact surface between the side plate 11 and the stay member 13. FIG. 4B depicts a contact surface between the side plate 12 and the stay member 13.

Figure 5:
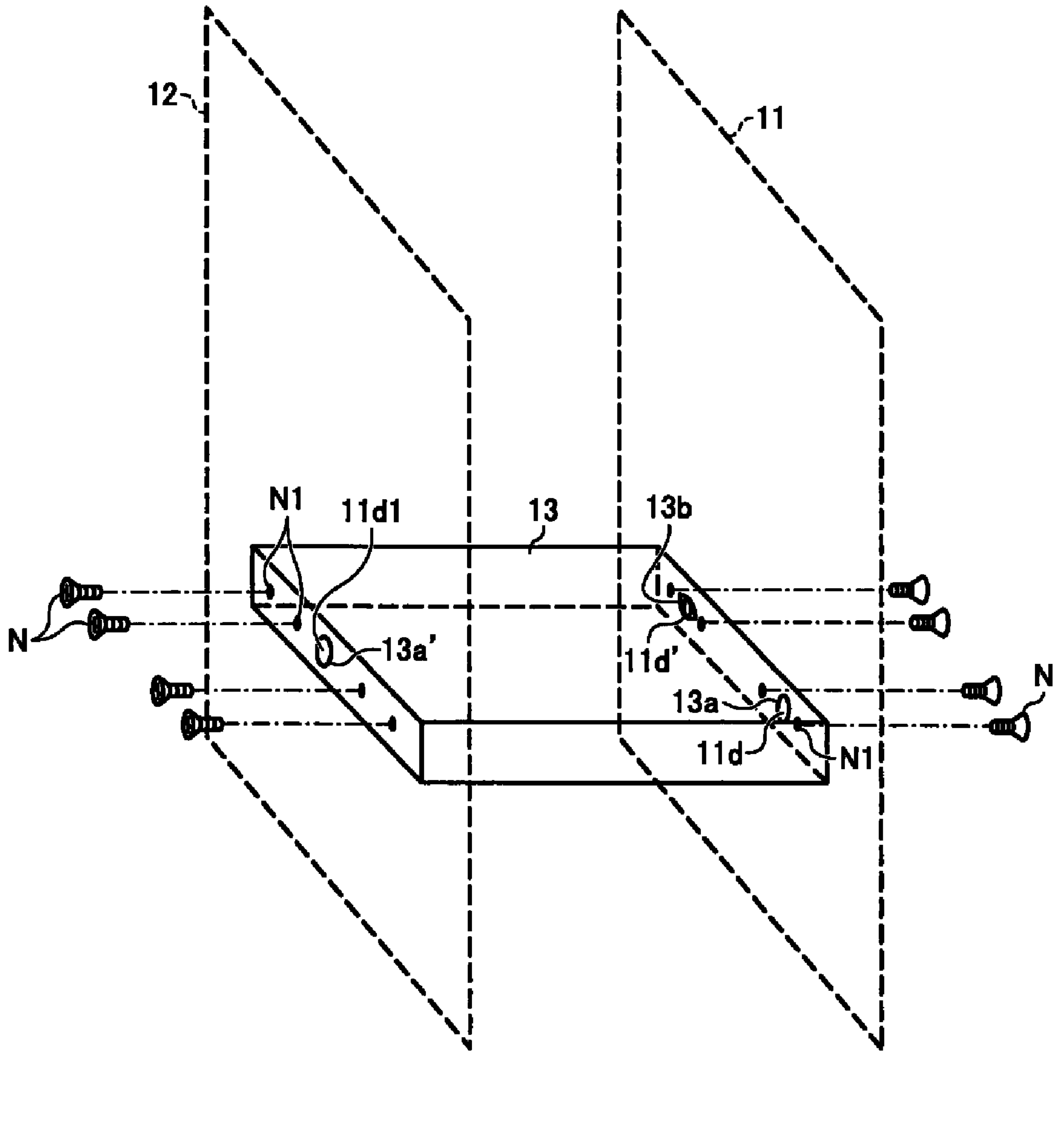
FIG. 5 is a schematic diagram for explaining how the side plates and the stay member are fastened.

The side plates 11 and 12 are connected to each other by the stay member 13 laterally provided therebetween. As shown in FIG. 5, they are fastened to each other by using the fastening portions respectively provided on the side plates 11 and 12 and the stay member 13.

In FIG. 5, the fastening portions are structured to insert screws N into screw holes formed on the end faces of the stay member 13 through screw inserting holes N1 formed on the side plates 11 and 12. It is noted that the structure of the fastening portion can be a welded structure such as rivet fastening and a spot welding instead of the structure using the screws.

As explained above, in the structure to correct the displacement between the side plates, when the stay member 13 is to be laterally provided and fixed in between the side plates 11 and 12 for their connections, for example, the surface plate and the jig are used to allow the side plates 11 and 12 to keep an ideal facing positional relationship so that the side plates can support the objects to be supported. Based on this relationship, the front-side convex portion 11*d* on the side plate 11 and the single convex portion 11*d*1 on the side plate 12 are fitted in the concave portions 13*a* and 13*a*' of the stay member 13 respectively, and then the rear-side convex portion 11*d*' is fitted in the concave portion 13*b* of the stay member 13.

In the state as shown in FIG. 5, the screws N are used to fasten the stay member 13 to the side plates 11 and 12. However, the stay member 13 is not fixed to the side plates 11 and 12 until then. Therefore, the stay member 13 is temporarily fixed to the side plates 11 and 12 in the state where various devices are supported by the supporting portions for the devices in the side plates 11 and 12. When they are to be finally fastened from the temporarily fixed state, the stay member 13 slightly shifts to adjust itself to the fastened positions of the side plates 11 and 12 and is fastened thereto. During this operation, the facing relationship between the side plates 11 and 12 is not lost, and the positional relationship between the objects to be supported and the side plates 11 and 12 can be kept to a predetermined positional relationship.

Furthermore, by providing the convex portions on the side plates 11 and 12 and providing the corresponding concave portions on the stay member 13, even if the external force is affected on the stay member 13, deformation of the stay member 13 can be comparatively effectively suppressed as compared with a case where the concave portions are provided on the side plates 11 and 12 and the corresponding convex portions are provided on the stay member 13. More specifically, if the external force is affected on the stay member 13 through the side plates 11 and 12, bending moment does not occur in the stay member 13 when the external force is received by shear surfaces of the concave portions as compared with the case where the external force is received by the surfaces of the convex portions formed on the same plane as the top surface of the stay member 13. Thus, the deformation of the stay member 13 hardly occurs.

Accordingly, by using the supporting portions (concave portions) where such bending moment does not occur in the stay member 13, the deformation of the stay member 13 can be prevented. Further, by preventing the change of a facing interval between the side plates, the change of the positions where the objects to be supported are attached can be prevented. Thus, by preventing misregistration between transferred images caused by the change of the positional relationship between the objects to be supported, occurrence of abnormal images can be resolved.

A relationship between the size of the rear-side convex portion 11*d*' on the side plate 11 and the size of the corresponding concave portion 13*b* on the stay member 13 is such that the length of the concave portion 13*b* in the horizontal direction can accommodate the displacement upon the fitting.

As shown in FIG. 1, a location where the stay member 13 is arranged in the image forming apparatus is selected as one which is below the waste toner tank TG and above the sheet feeder 5.

The waste toner tank TG collects and contains therein non-transferred toner remaining on the intermediate transfer belt 41. A pipe provided in a cleaning device for the intermediate transfer belt 41 is connected to the waste toner tank TG so as to enable the collected non-transferred toner to be guided to the waste toner tank TG. When it is filled with the non-transferred toner, the waste toner tank TG is taken out to the outside and the contained toner is subjected to a collecting process, and when the waste toner tank TG is again inserted into the apparatus, the collecting process is prepared for collecting new waste toner.

By providing the stay member 13 below the waste toner tank TG, toner leaked from the tank when the waste toner tank TG is pulled out is prevented from falling to the sheet feeder 5, which prevents the transfer material P as a sheet stored in the sheet feeder 5 from being contaminated with the toner.

The stay member 13 has a piece portion 13B that protrudes towards the front side of the side plates 11 and 12. A convex portion 13B1 (FIG. 17) covering the periphery of a sheet-feed roller 52 is provided on the piece portion 13B at a location corresponding to the sheet-feed roller 52. A concave portion following the shape of the convex portion 13B1 is provided at a location of the waste toner tank TG facing the convex portion 13B1. Therefore, both of them are prevented from interference with each other.

FIG. 17 depicts how the stay member 13 and the waste toner tank TG are arranged. When the waste toner tank TG is attached to or detached from the apparatus, the waste toner tank TG moves on the convex portion 13B1 located on the stay member 13.

When the waste toner tank TG is detached from the apparatus, the waste toner tank TG is slid on the stay member 13. At this time, the waste toner tank TG is removed by sliding on the convex portion 13B1 of the stay member 13. When it is attached to the apparatus, the waste toner tank TG is positioned and fixed by positioning portions of the side plates. The waste toner tank TG is held only by the side plates when it is fixed, and thus, it is held so as to remain suspended above the stay member 13.

Accordingly, even if the sheet-feed roller 52 is disposed near the waste toner tank TG, it does not block the movement of the waste toner tank TG, and the position of the sheet-feed roller 52 and the position of the waste toner tank TG can overlap in the vertical direction. Thus, their installation space in the vertical direction can be reduced. By using such a structure as above, the stay member 13 has a length corresponding to a movement stroke of the waste toner tank TG, and this allows an apparatus body to have its depth with a length as long as possible. Thus, by increasing the length of the facing surface to the side plates and by increasing the structure strength, the effect to prevent torsional deformation of the side plates can be enhanced.

The sheet feeder 5 located below the stay member 13 has a sheet-detection sensor (not shown) on the bottom of the stay member 13. The sheet-detection sensor detects whether the sheet feeder 5 has run out of the transfer material P. When the transfer material P is run out of it, the sheet-detection sensor outputs a signal indicating an alarm displayed on a display unit (not shown) of the apparatus.

Based on the structure, a backing member is provided on the side plates at one side in its front-to-rear direction. More specifically, the backing member connects the side plates to each other in a non-parallel state to the stay member which is a plate material, so that the backing member can help prevention of the displacement between the side plates.

Figure 6:
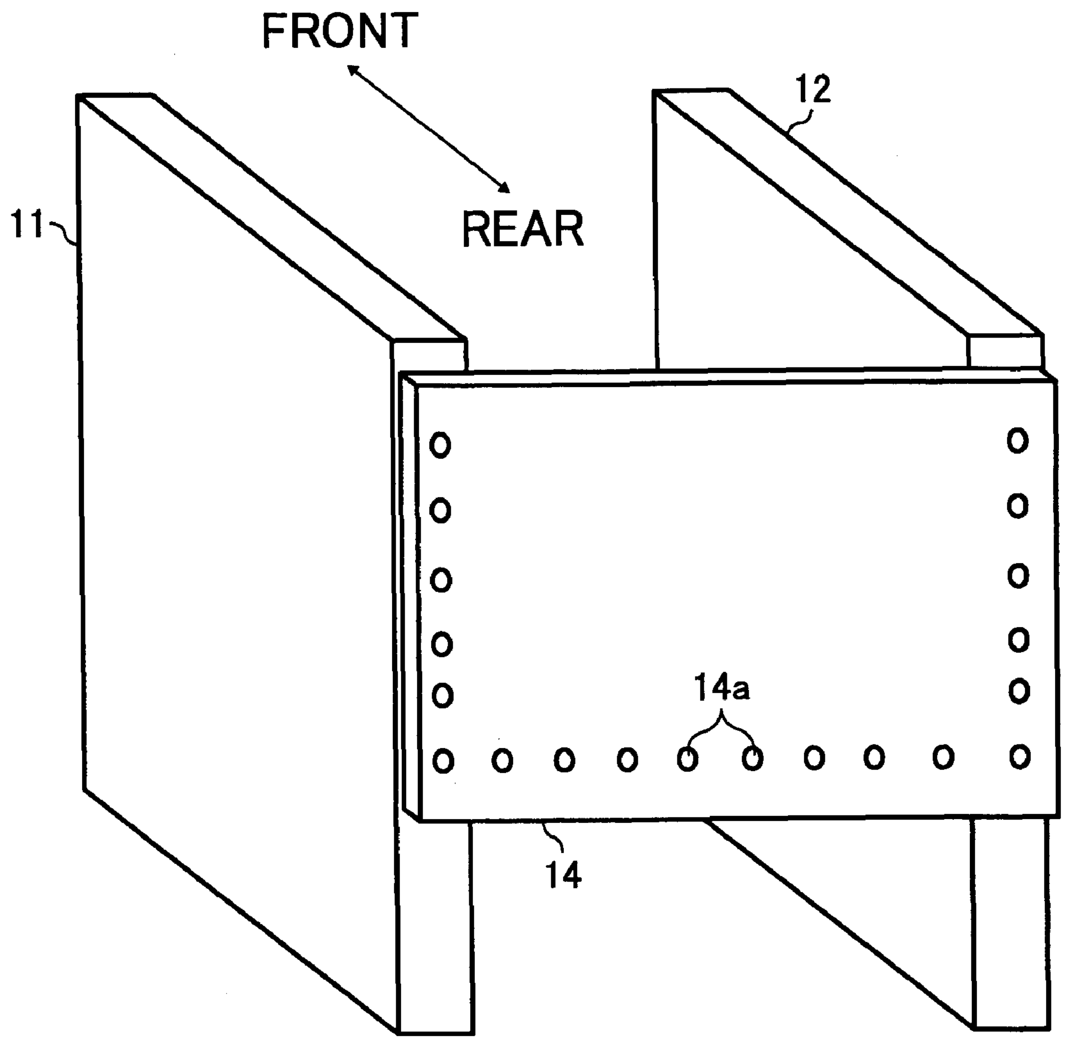
FIG. 6 is a schematic diagram of a modification of the structure shown in FIG. 2.

FIG. 6 is a schematic diagram of this structure. A backing member 14 for connecting the side plates 11 and 12 to each other is provided on the rear side as one side in the front-to-rear direction of the side plates 11 and 12 in the non-parallel state to the stay member 13 as shown in FIG. 2, that is, in a state in which the surface of the stay member 13 and that of the backing member 14 are not parallel to each other.

The backing member 14 is a stay member laterally provided between the side plates 11 and 12 to connect them to each other, and each connection position between the backing member 14 and the side plate 11 or 12 is fastened and fixed by using screws. In FIG. 6, screw inserting holes 14*a* are formed on the backing member 14. The fastened position by using the screws includes not only the side plates 11 and 12 but also a facing portion to the stay member 13 as a target portion.

In the structure, for example, the backing member 14 is structured so that its second moment of area is smaller than that of the stay member 13, which causes the backing member 14 to be more easily deformed than the stay member 13. Thus, the deformation due to the external force is made harder to be propagated to the stay member 13. In other words, occurrence of distortion in the side plates 11 and 12 connected to the stay member 13 can be prevented by preventing the torsion of the stay member 13. Accordingly, the change of the positions of the objects to be supported which are jig plates 11 and 12 is prevented, and thus, it is possible to prevent occurrence of abnormal problems in an image obtained by using the objects to be supported.

To reduce the second moment of area of the backing member 14 than that of the stay member 13, the thickness of the backing member 14 may be reduced more than that of the stay member 13, or a material with a lower rigidity than that of the stay member 13 may be used.

One of features of the present embodiment is to provide first, second, third, and fourth connecting parts on respective side plates. More specifically, the front-side and rear-side convex portions are provided on each of the side plates 11 and 12. The front-side and rear-side concave portions, in which the convex portions are fitted, used for the first to the fourth connecting parts are provided on the stay member 13. Furthermore, a relationship between the convex portions and the concave portions is such that the convex portions and the concave portions located on the rear side are provided in a loose-fitting state.

The term "loose-fitting state" as used herein refers to a state where the convex portion can freely move due to a dimensional difference between the concave portion and the convex portion.

Figure 7A:
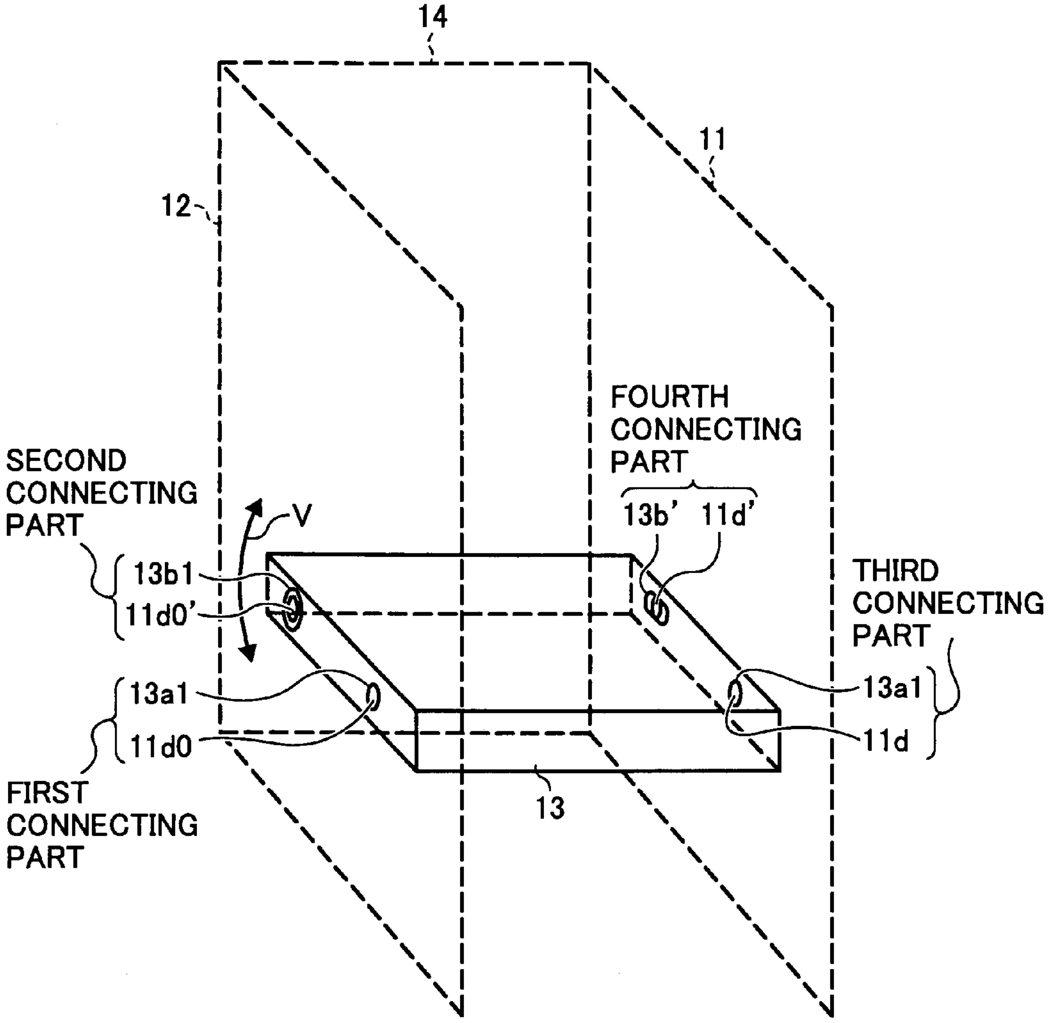
FIG. 7A is a schematic diagram for explaining a frame structure according to the embodiment.

FIG. 7A is a schematic diagram of this structure. A front-side convex portion 11*d*0, a rear-side convex portion 11*d*0', the front-side convex portion 11*d*, and the rear-side convex portion 11*d'* are provided on the side plates 11 and 12 as one parts of the first, second, third, and fourth connecting parts, respectively, along the front-to-rear direction of the side plates. Provided on the end faces of the stay member 13 facing the respective convex portions are a front-side concave portion 13*a*1, a rear-side concave portion 13*b*1, the front-side concave portion 13*a*1, and a rear-side concave portion 13*b'* respectively, as the other parts of the first to the fourth connecting parts.

More specifically, as shown in FIG. 7A, the first connecting part includes the front-side convex portion 11*d*0 and the front-side concave portion 13*a*1, the second connecting part includes the rear-side convex portion 11*d*0' and the rear-side concave portion 13*b*1, the third connecting part includes the front-side convex portion 11*d* and the front-side concave portion 13*a*1, and the fourth connecting part includes the rear-side convex portion 11*d'* and the rear-side concave portion 13*b'*.

The front-side convex portions 11*d* and 11*d*0 in the respective side plates 11 and 12 and the front-side concave portions 13*a*1 in the stay member 13 are formed so that precise fitting can be obtained because there is almost no dimensional difference between each of the convex portions and each of the corresponding concave portions in the same manner as shown in FIG. 2. However, the rear-side convex portions 11*d'* and 11*d*0' in the respective side plates 11 and 12 and the rear-side concave portions 13*b'* and 13*b*1 in the stay member 13 are structured in the loose-fitting state respectively.

Figure 7B:
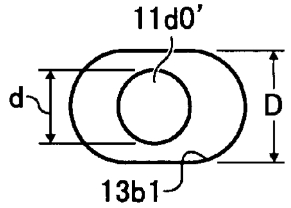
FIG. 7B is a schematic diagram of one of connecting parts shown in FIG. 7A.

More specifically, the rear-side concave portion 13*b'* on the stay member 13 facing the side plate 11 has a dimensional difference corresponding to the horizontally elongated hole as shown in the concave portion 13*b* on the stay member 13 of FIG. 2. The rear-side concave portion 13*b*1 facing the side plate 12 is an elongated hole having the same dimensional difference in the horizontal direction as that of the rear-side concave portion 13*b'*, but has a different structure therefrom in the vertical direction as shown in FIG. 7B. More specifically, the elongated hole for use in this case has a dimensional difference (D–d) of about 1 millimeter also in the vertical direction with respect to the rear-side convex portion 11*d*0'.

The structure of FIG. 7A includes the backing member 14 as shown in FIG. 6. Based on this structure, the convex portions and the concave portions which are in the loose-fitting state due to the dimensional difference, namely, the rear-side convex portions 11*d'* and 11*d*0' in the respective side plates 11 and 12 and the rear-side concave portions 13*b'* and 13*b*1 in the stay member 13 are provided close to the backing member 14. The front-side convex portions 11*d* and 11*d*0 in the respective side plates 11 and 12 and the front-side concave portions 13*a*1 in the stay member 13, which have almost no dimensional difference, are provided at positions away from the rear-side convex portions 11*d'* and 11*d*0' and the rear-side concave portions 13*b'* and 13*b*1 respectively in the front-to-rear direction.

The first and third connecting parts have precise fitting, and the second connecting part has a loose-fitting state in the V direction. The fourth connecting part has a size difference between the portions only in the front-to-rear direction. Therefore, if the parallelism between the side plates is defined, the rear-side convex portion 11*d*0' is in the loose-fitting state in the V direction within a range of the rear-side concave portion 13*b*1 which is a larger hole.

The following effects can be obtained from the structure.

Because the side plate 12 can be fixed to the stay member 13 while the parallelism to the side plate 11 is adjusted, it is prevented that the parallelism is lower or is lost due to variation of the stay member 13. Furthermore, because the pivotal movement in the V direction can be suppressed within the range of the size of the rear-side concave portion 13*b*1 upon adjustment of the side plate 12, it is easy to adjust it. The adjustment may be performed using a method of pivoting the side plate 12 with respect to the stay member 13 and the side plate 11, or using a method of pivoting the fixed stay member 13 and side plate 11 with respect to the side plate 12.

According to this structure, because each relationship between the front-side convex portion 11*d* or 11*d*0 and the corresponding front-side concave portion 13*a*1 or 13*a*1 has almost no dimensional difference, this relationship can be decisive when the stay member 13 is fixed to the side plates 11 and 12. On the other hand, the rear-side convex portion 11*d*' facing the side plate 11, of the rear-side convex portions, and the rear-side concave portion 13*b*' have the dimensional difference. Therefore, similarly to the structure shown in FIG. 2, the displacement in the rotational direction is restricted, and the side plate 11 and the stay member 13 are thereby fixed to each other.

As is the case of FIG. 2, arrow V of FIG. 7A indicates the direction in which the torsional angle of the side plate 12 is allowed according to the parallelism between the side plates 11 and 12 after the side plate 11 and the stay member 13 are fixed. Therefore, in this case also, when the stay member 13 is fixed to the side plate 12 of which parallelism to the side plate 11 is defined, the torsional angles of the stay member 13 to the side plates 11 and 12 can be restricted based on the facing relationship between the side plates, without depending on the accuracy of the stay member 13.

In this case, the rear-side concave portion 13*b*1 facing the side plate 12 is set to a size as a dimensional difference in the lateral direction (vertical direction). More specifically, the size of the rear-side concave portion 13*b*1 is set to a size having some room or to be larger than this size to fit the rear-side convex portion 11*d*0' therein so as to cause backlash of the rear-side convex portion 11*d*0' to occur, and the stay member 13 is caused to pivot within a range where the backlash occurs. This is because the fastened position between the side plate 12 and the stay member 13 is prevented from being largely displaced when the stay member 13 is pulled by torque upon fastening of the side plate 12 and the stay member 13 or when the external force is affected on the fastened position after the jig is removed during the assembly.

However, if the dimensional difference in the lateral direction (vertical direction) is increased carelessly, then the fastened position between the side plate 12 and the stay member 13 is largely displaced, which is inappropriate. In other words, the size of the rear-side concave portion 13*b*1 needs to have such room that the backlash due to the rear-side convex portion 11*d*0' is caused to occur, and needs not to be too large. It is most appropriate that the size of a space causing the backlash (difference in size between the rear-side concave portion 13*b*1 and the rear-side convex portion 11*d*0') is dimensional accuracy of the components or more, and that the torsional angle between the side plate 12 and the stay member 13 is set to an allowable value or less. Because of this reason, the dimensional difference of 1 millimeter or less is selected.

With this structure, the backing member 14 prevents the displacement of the convex portion and the concave portion which are in the loose-fitting state, due to external force. Therefore, the relative position between the rear-side convex portion and the rear-side concave portion, which have the dimensional difference and are in the loose-fitting state, is prevented from easily deviating based on the front-side convex portions and the front-side concave portions which function as the positioning portion and also function as fulcrums. Furthermore, occurrence of the deformation such as torsion in the stay member 13 is prevented, and thus, occurrence of the displacement between the objects to be supported can be prevented.

The frame explained with reference to FIG. 7A is structured, when part of a wall portion of the image forming apparatus is an openable/closable cover member, to prevent displacement of the side plates near the cover member.

Figure 16:
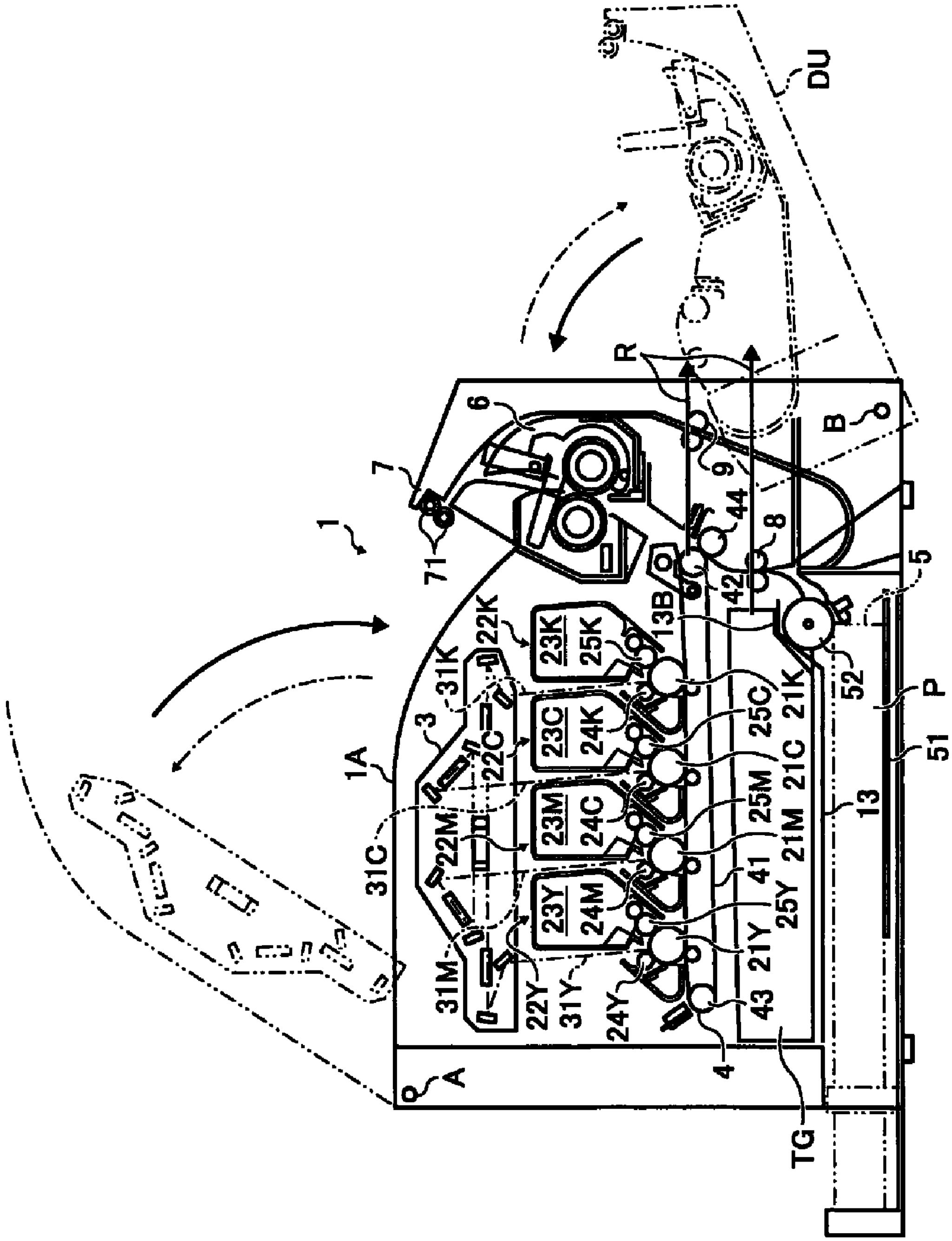
FIG. 16 is a schematic diagram of a partially modified example of the structure shown in FIG. 1.

FIG. 16 depicts a structure in which part of a wall portion of the image forming apparatus is used as such a cover member that can be opened/closed with respect to the apparatus body.

As indicated by phantom lines in FIG. 16, the image forming apparatus is structured such that part of the top surface and part of the sidewall of the apparatus body serve as the cover members (indicated by DU in FIG. 16). The cover members can open/close with respect to the apparatus body, i.e., swing about pivotal fulcrums A and B, respectively.

In the image forming apparatus shown in FIG. 16, the sheet feeder, the imaging unit, and the sheet discharge unit are arranged in this order form the lower side, and a sheet conveying path is provided on the front side of the apparatus.

The sheet conveying path extends from the sheet-feed roller 52 of the sheet feeder 5 to a sheet discharge tray 1A on the top surface of the apparatus through registration rollers 8, the secondary transfer unit 44, and the fixing unit which are arranged above the sheet-feed roller 52.

When the cover member swings open about the pivotal fulcrum B located at the lower part of the sidewall, the sheet conveying path is exposed to the outside. Thus, the transfer material P causing a sheet jam along the sheet conveying path can be removed. In addition, removable units such as the waste toner tank TG and a transfer device 4 can be taken out of the apparatus as indicated by letter R.

Figure 18:
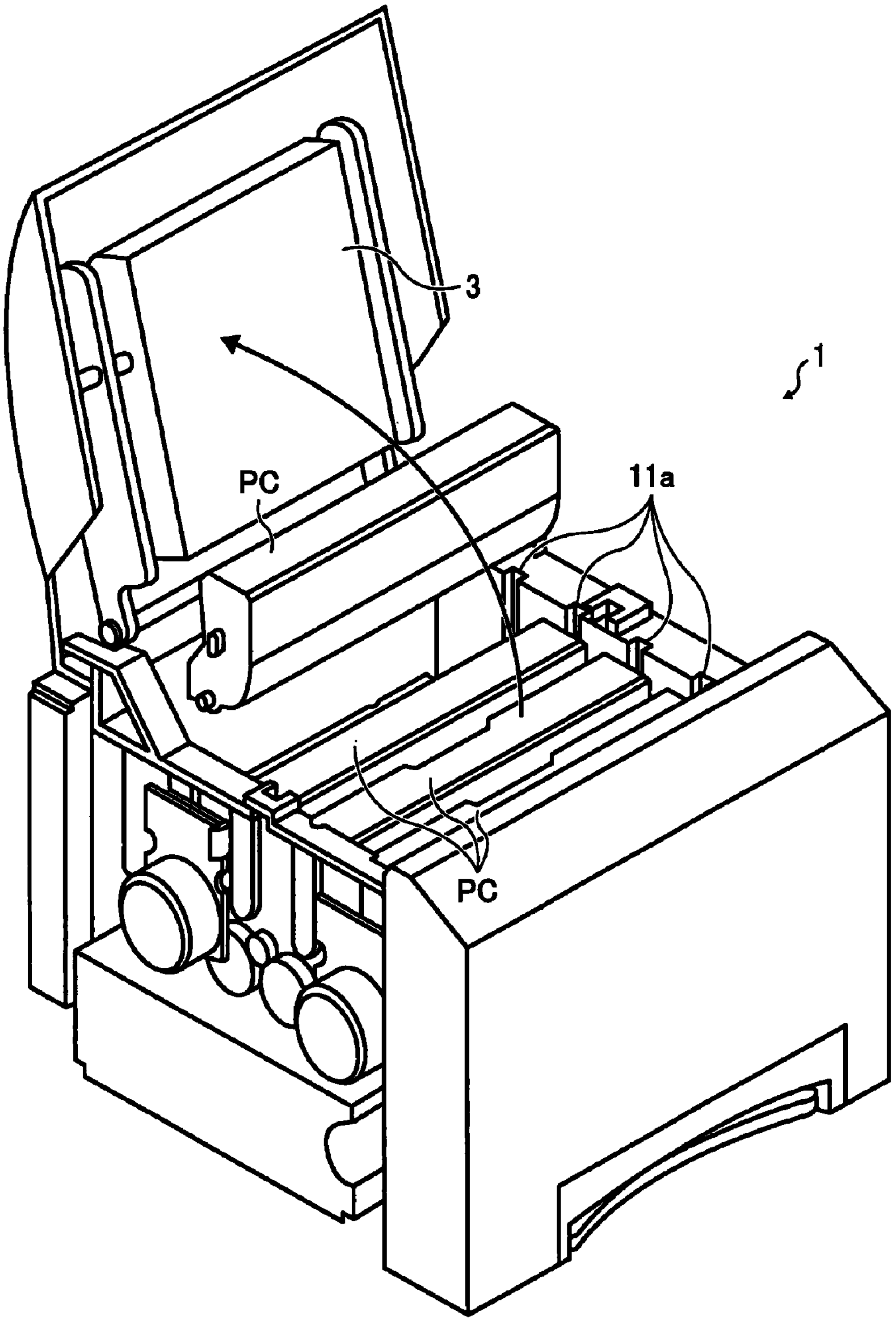
FIG. 18 is a perspective view when the part of the image forming apparatus shown in FIGS. 1 and 6 when the part thereof is opened.

As shown in FIG. 18, the cover member on the top surface of the apparatus is opened/closed about the pivotal fulcrum A to, for example, replace a process cartridge PC of the imaging units. The process cartridge PC is guided by the image-carrier supporting portions 11*a* and 12*a* (see FIGS. 8 to 14) formed on the side plates 11 and 12, respectively, and thereby positioned.

The side plates used in the structure provided with such an openable/closable sidewall have sometimes problems such that the facing interval on the front side changes due to opening/closing of the front side in the front-to-rear direction of the sidewall, to lose their parallelism. Particularly, when the sidewall is opened, the external force is often affected on the facing interval when the waste toner tank TG and the transfer device 4 are inserted or taken out. Sidewalls are disconnected from each other due to the opened sidewall, and thus the parallelism between the side plates is easily lost.

If the side plates are not parallel to each other, then the positional relationship between the members or devices supported thereby changes, which causes image misregistration to occur due to the displacement.

In the structure of FIG. 7A, the front-side convex portion 11*d*0 and the front-side concave portion 13*a*1 included in the first connecting part and the front-side convex portion 11*d* and the front-side concave portion 13*a*1 included in the third connecting part form reference positions each of which has almost no dimensional difference. These portions are provided on the front side in the front-to-rear direction of the side plates 11 and 12 corresponding to the opened/closed sidewall, which enables to maintain the strength such that the side plates are prevented from becoming non-parallel when the sidewall is opened.

Furthermore, the backing member 14 is provided on the rear side in the front-to-rear direction of the side plates 11 and 12, and the rear-side concave portions 13*b*' and 13*b*1 which have the different sizes with the dimensional accuracy of the components or more are also provided on the rear side. The side plates are thereby reliably fixed to the stay member 13, and thus the side plates can be maintained to be parallel to each other. It is noted that each formational relationship of the rear-side concave portions 13*b*' and 13*b*1 to the respective side plates may be reversed to the case of FIG. 7A. That is the rear-side concave portions 13*b*' provided on the side plate 11 may be provided on the side plate 12, and the rear-side concave portions 13*b*1 provided on the side plate 12 may be provided on the side plate 11. Moreover, any form of the stay member 13 can be selected from among a thin plate, a thick plate, a box-shape, or the like as necessary.

Figure 8:
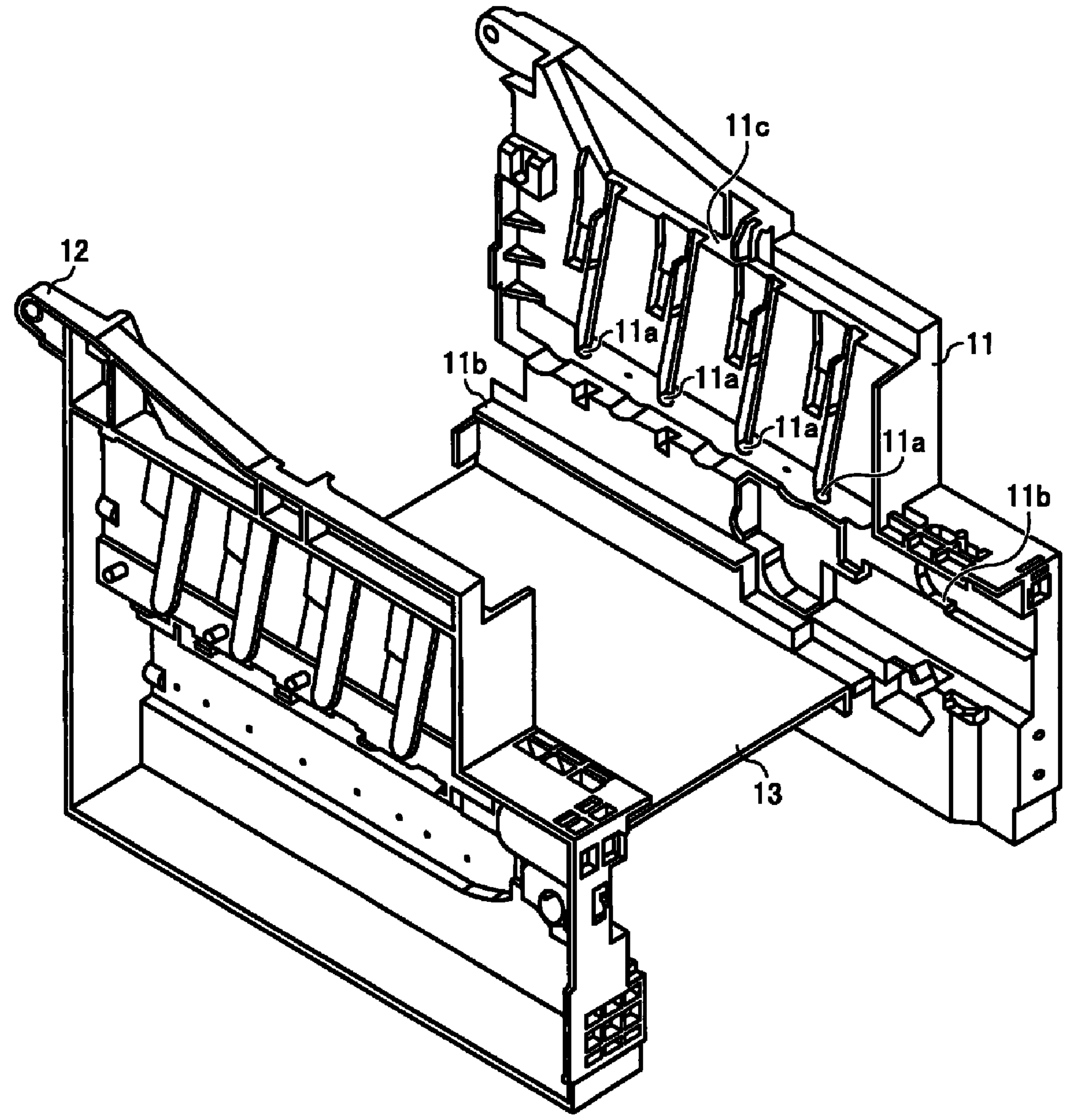
FIG. 8 is a perspective view of the structure shown in FIG. 2 viewed from a side other than side-plate sides.

FIG. 8 is a perspective view of a frame structure representing how the stay member 13 is fixed to the side plates 11 and 12.

The side plates 11 and 12 are formed with molded components made of a resin material such as polycarbonate, and the facing surface to the side plate 12 is provided with the supporting portions 11*a*, 11*b*, and 11*c* for the objects to be supported. It is noted that the facing surface to the side plate 11 is shown in FIG. 10.

Figure 9:
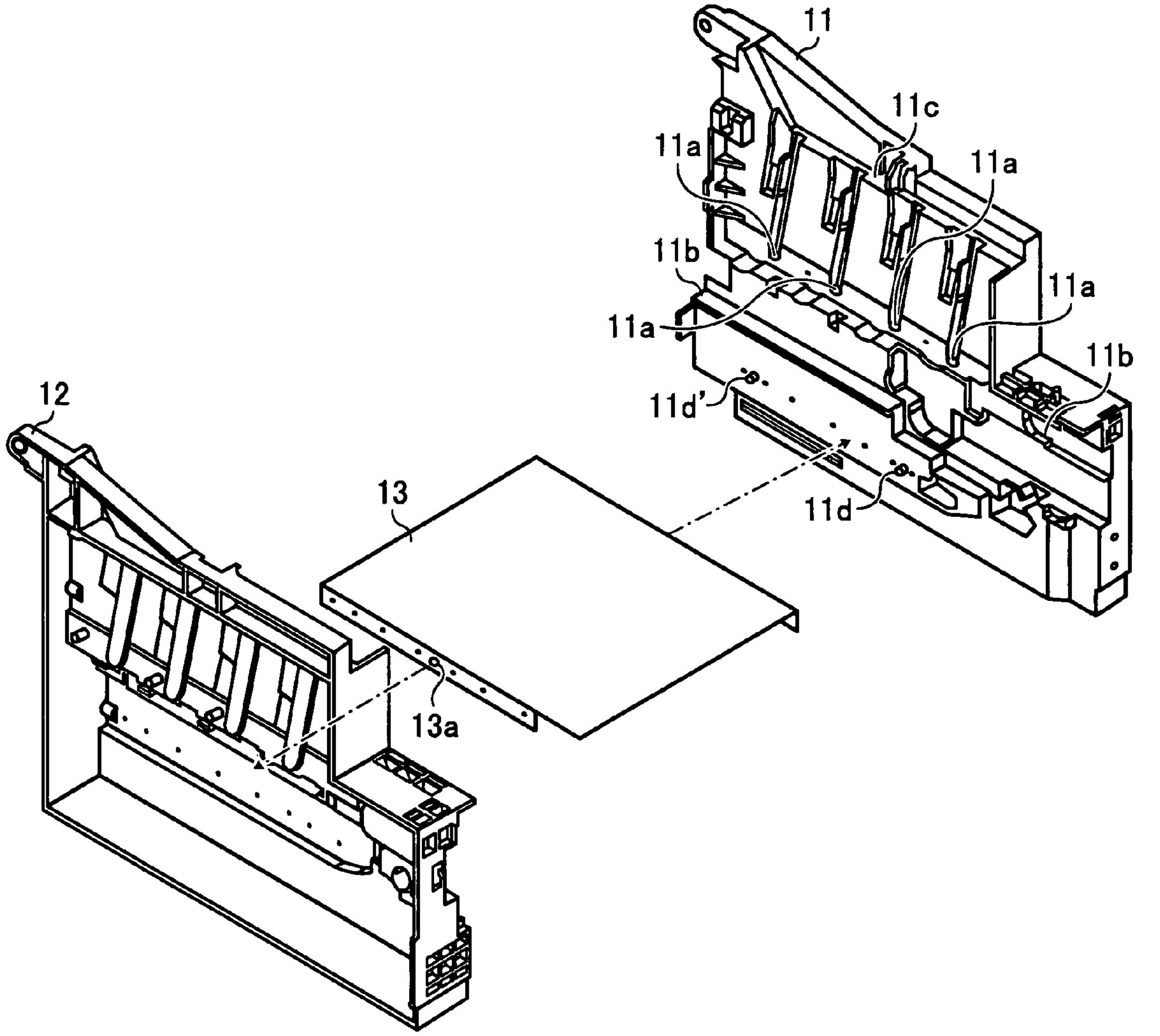
FIG. 9 is an exploded perspective view of the structure shown in FIG. 8.

As shown in FIG. 9, the side plate 11 is provided with the front-side convex portion 11*d* and the rear-side convex portion 11*d*'. As shown in FIG. 10, the side plate 12 is provided with a single convex portion 12*d* at a position based on the principle explained with reference to FIG. 2.

In the present embodiment, bosses are used as the convex portions.

Figure 10:
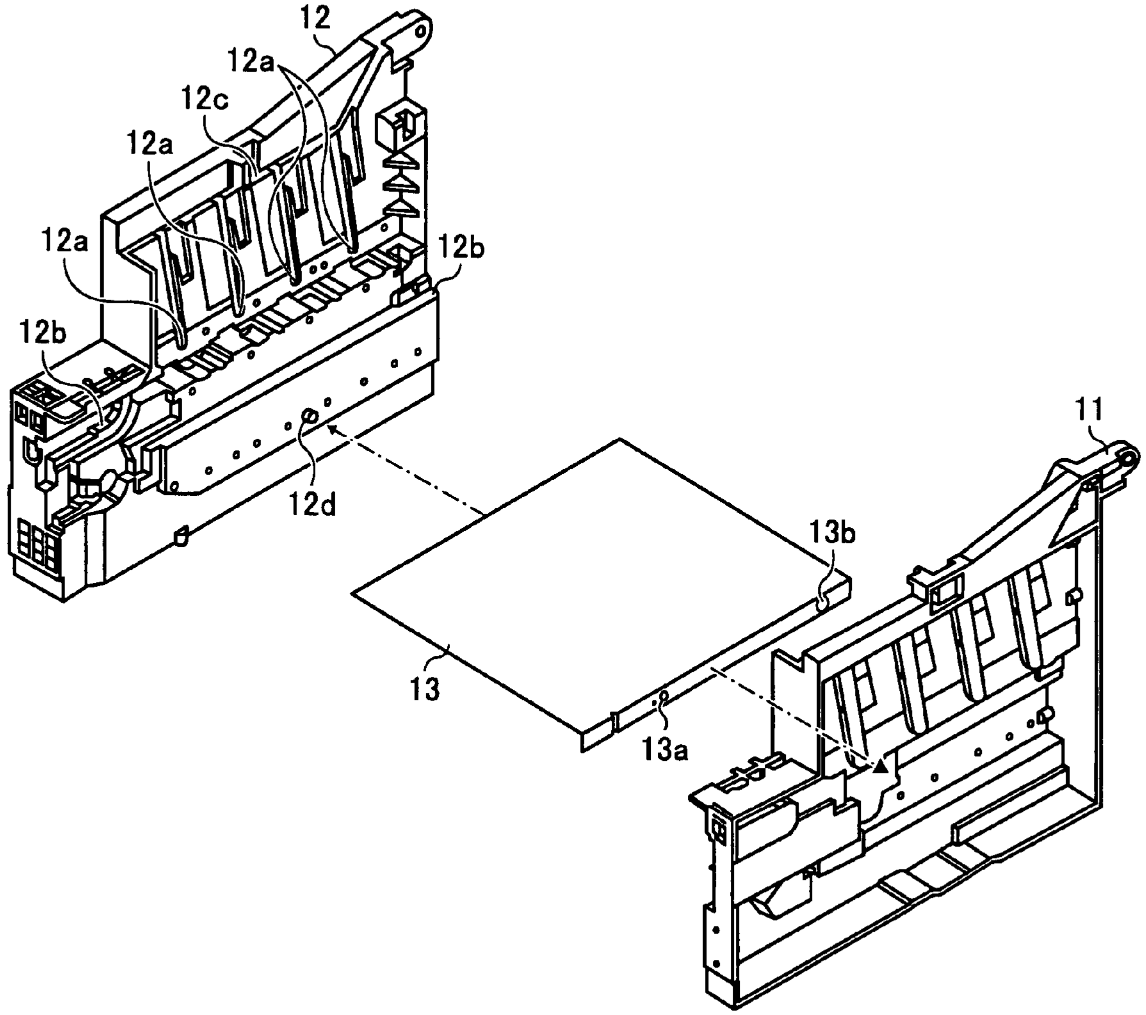
FIG. 10 is an exploded perspective view of the structure shown in FIG. 2 viewed from one of the side-plate sides.

The stay member 13 shown in FIGS. 9 and 10 is formed with a sheet metal material using a steel material such as SECC. The front-side concave portion 13*a* and the rear-side concave portion 13*b* are provided on the end face of the stay member 13 facing the side plate 11 (see FIG. 10), and the concave portion 13*a* is provided on the end face thereof facing the side plate 12 (see FIG. 9).

In the present embodiment, a hole is used for the concave portion so that the boss as the convex portion can be fitted therein.

In the present embodiment, the stay member 13 is made of not resin but a material such as SECC. Therefore, the cross section thereof to ensure the rigidity can be reduced differently from the case of resin-made stay member. As a result, the increase of the height of the apparatus can be prevented. Besides that, the workability is excellent as compared with a stainless steel and the like, and thus a low-cost material can be used.

The present embodiment is structured as explained above, and, therefore, when the stay member 13 is fitted in between the side plates 11 and 12, the convex portion 11*d* on the side plate 11 and the concave portion 13*a* on the stay member 13 are used as a positioning reference for fitting between the side plate 11 and the stay member 13. In this case, because the front-side convex portion 11*d* and the corresponding concave portion have no dimensional difference and the single convex portion 11*d*1 and the corresponding concave portion also have no dimensional difference, the convex portions are fitted therein respectively without displacement. At the same time, there is a dimensional difference between the rear-side convex portion 11*d*' and the concave portion 13*b*, the displacement in the rotational direction is thereby restricted as explained with reference to FIG. 2. As a result, the side plate 11 and the stay member 13 are fixed to each other.

Figure 11:
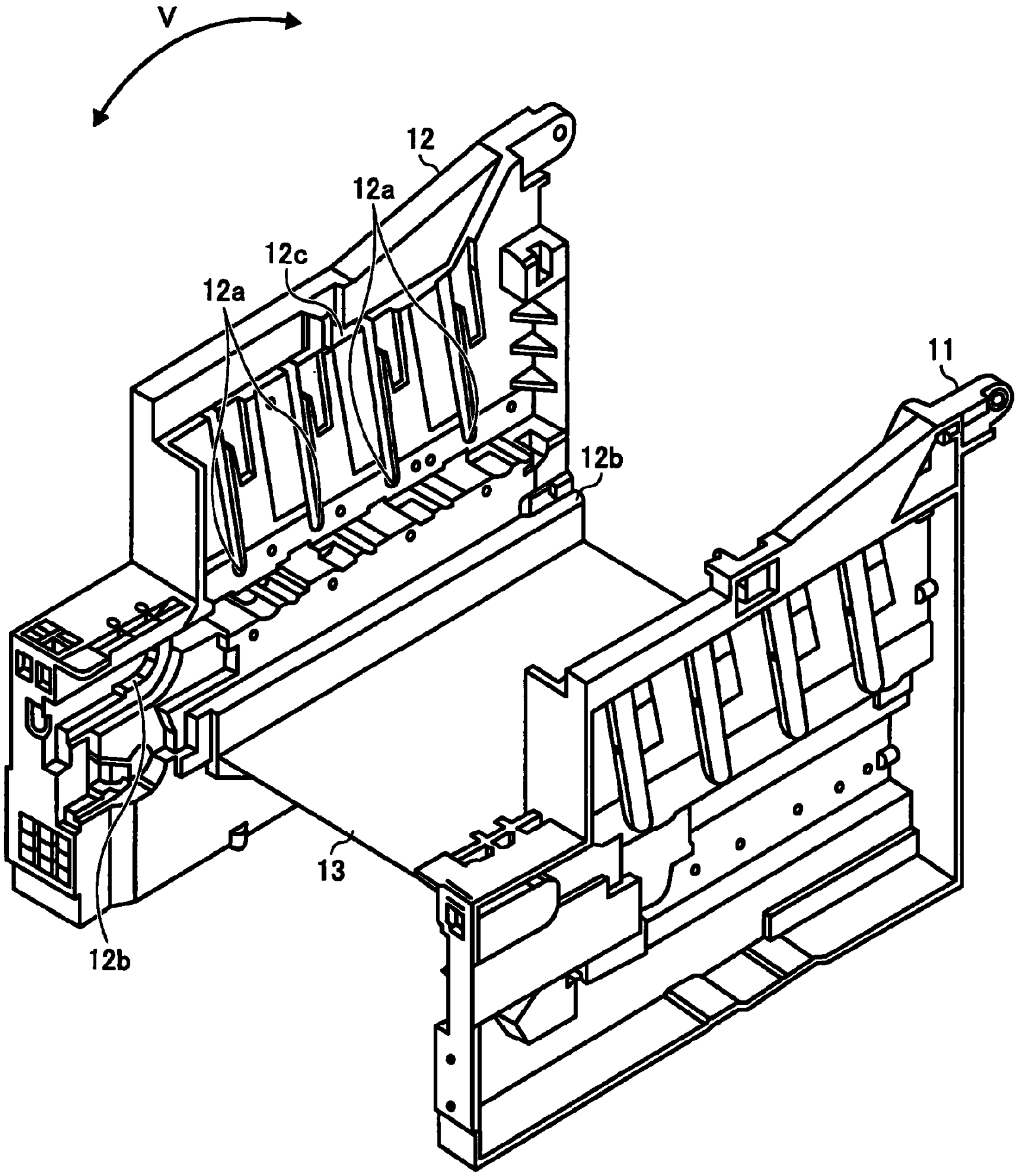
FIG. 11 is a perspective view of the structure shown in FIG. 2 viewed from one side of the side-plate sides.

Furthermore, the relationship between the convex portion 12*d* on the side plate 12 and the concave portion 13*a* (see FIGS. 9 and 10) allows pivotal movement of the stay member 13 in the direction indicated by arrow V in FIG. 11. Therefore, similarly to FIG. 2, the torsional angle of the side plates 11 and 12 can be restricted without depending on the accuracy of the stay member 13.

The stay member 13 is fastened to the side plates 11 and 12 in this state. At this time, the frame is completed by finally fastening the stay member 13 to the side plates 11 and 12 when an object to be supported is attached to any one pair of the supporting portions 11*a* and 12*a*, 11*b* and 12*b*, and 11*c* and 12*c* of the respective side plates 11 and 12 in a state before completion of final fastening i.e., in a state where the side plates 11 and 12 are temporarily fixed to the stay member 13.

When the stay member 13 is to be finally and completely fastened to the side plates 11 and 12, in fastened positions of the side plates 11 and 12 of which facing relationship such as the parallelism is previously defined by attaching an object to be supported, the end face of the stay member 13 on the right side is fitted with the side plate 11, and the end face thereof on the left side has rotational freedom with respect to the side plate 12 as indicated by arrow V. Therefore, the stay member 13 is fastened to the side plates 11 and 12 based on the fastened positions of the side plates 11 and 12. Even if any error occurs in the fastened position on the stay member 13, the stay member 13 shifts so as to adjust to the fastened positions of the side plates 11 and 12, differently from the case where fastening is performed based on the fastened positions of the stay member 13. This shift does not affect the facing relationship between the side plates 11 and 12.

Figure 12:
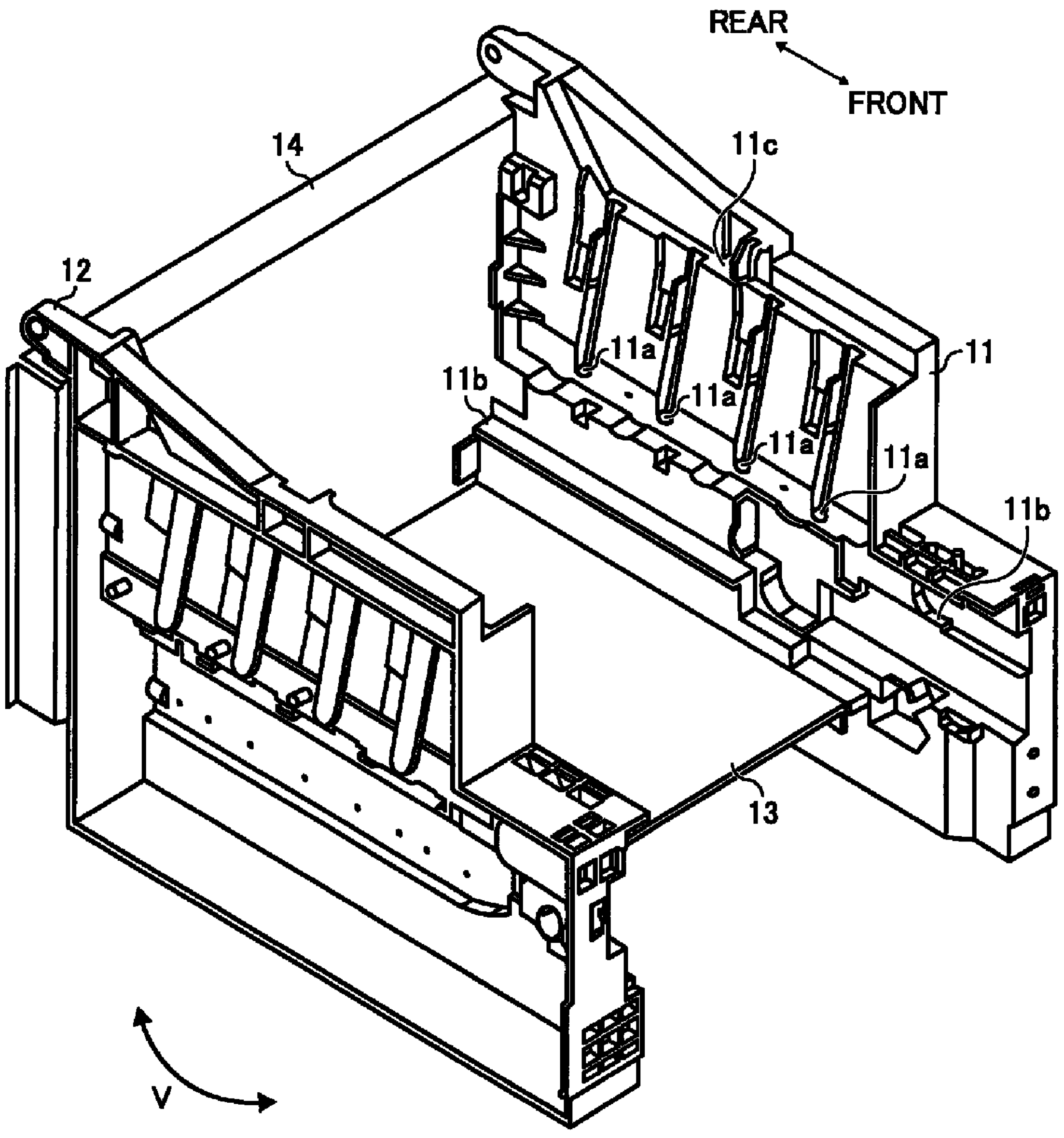
FIG. 12 is a perspective view of a frame according to the modification of the structure shown in FIG. 6.
Figure 13:
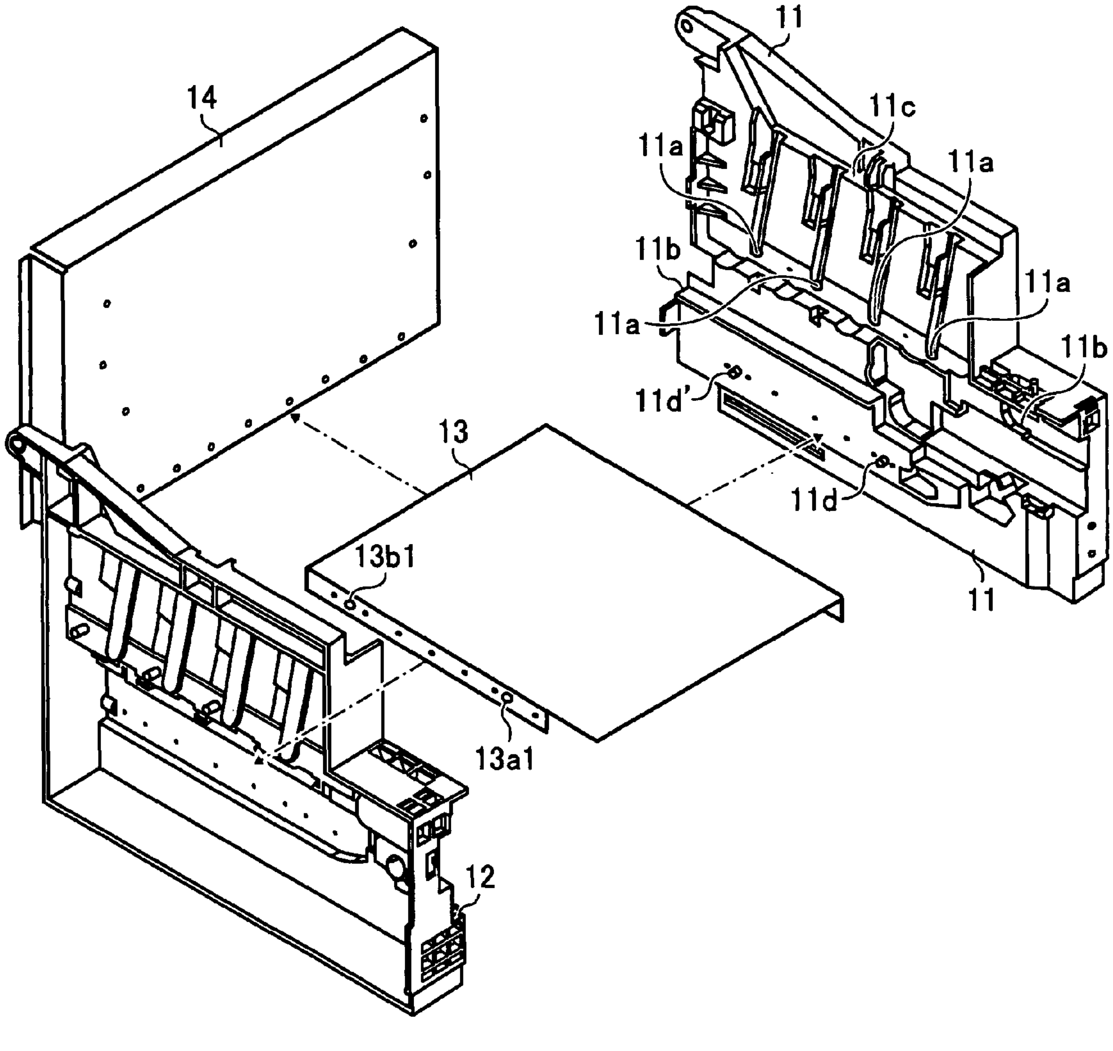
FIG. 13 is an exploded perspective view of the frame shown in FIG. 12 viewed from a side other than the side-plate sides.
Figure 14:
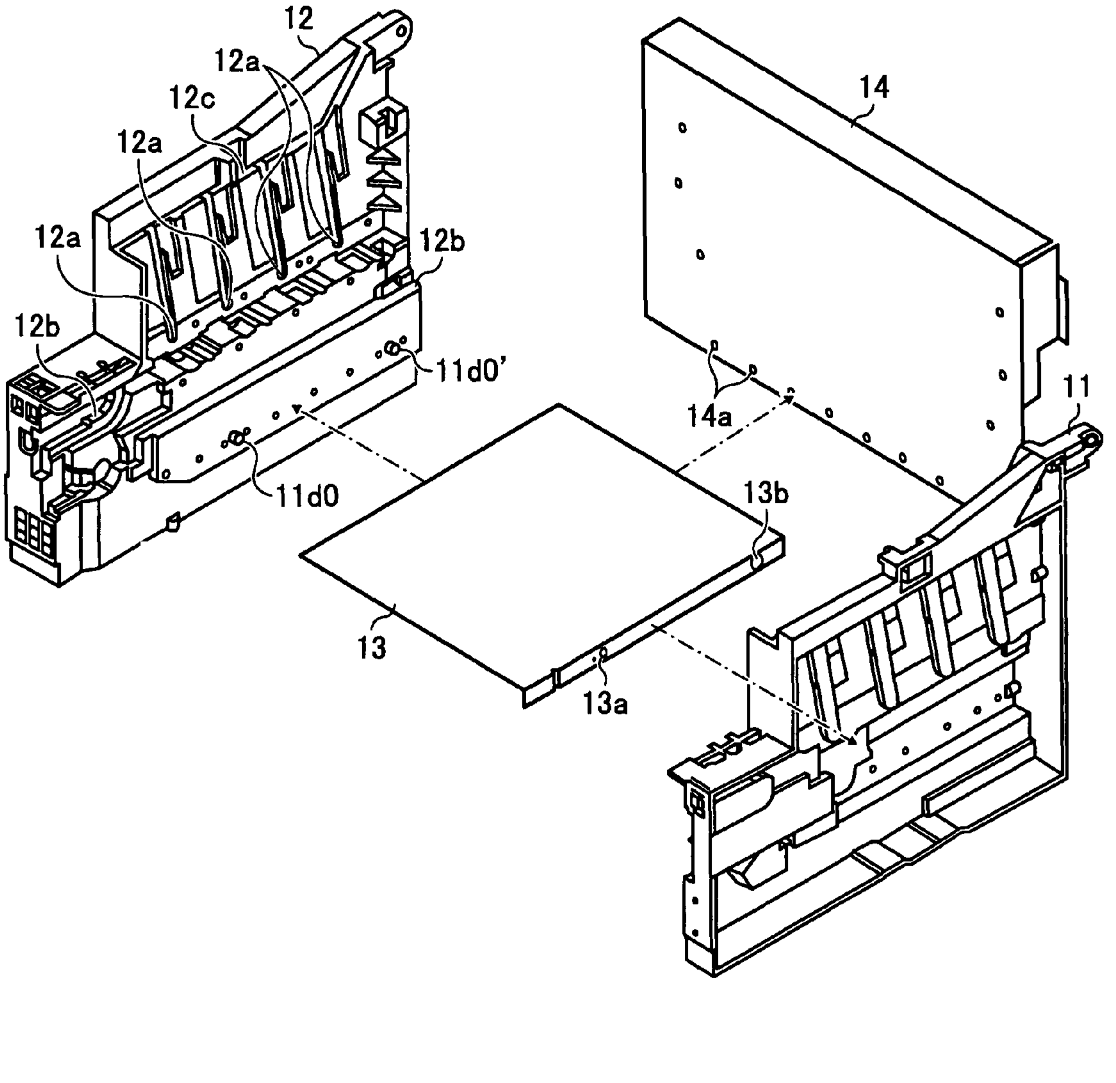
FIG. 14 is an exploded perspective view of the frame shown in FIG. 12 viewed from one of the side-plate sides.

FIGS. 12 to 14 are schematic diagrams of an example in which the backing member 14 of FIG. 6 is provided. Each fitting state between the stay member 13 and the side plates 11 and 12 in FIGS. 12 to 14 is the same as that of FIGS. 8 to 11. In the side plate 11, the fitting capability between the rear-side convex portion 11*d*' in the side plate 11 and the rear-side concave portion 13*b* in FIG. 12 is satisfactory due to the relationship between the rear-side convex portion 11*d*' and the rear-side concave portion 13*b*' shown in FIG. 7A. At the same time, the matching of the fastened positions can be obtained by pivotal movement of the stay member 13 on the side of the side plate 12.

On the other hand, the present embodiment employs the structure of enhancing the rigidity of the stay member 13 or the rigidity against the torsion in particular.

Figure 15:
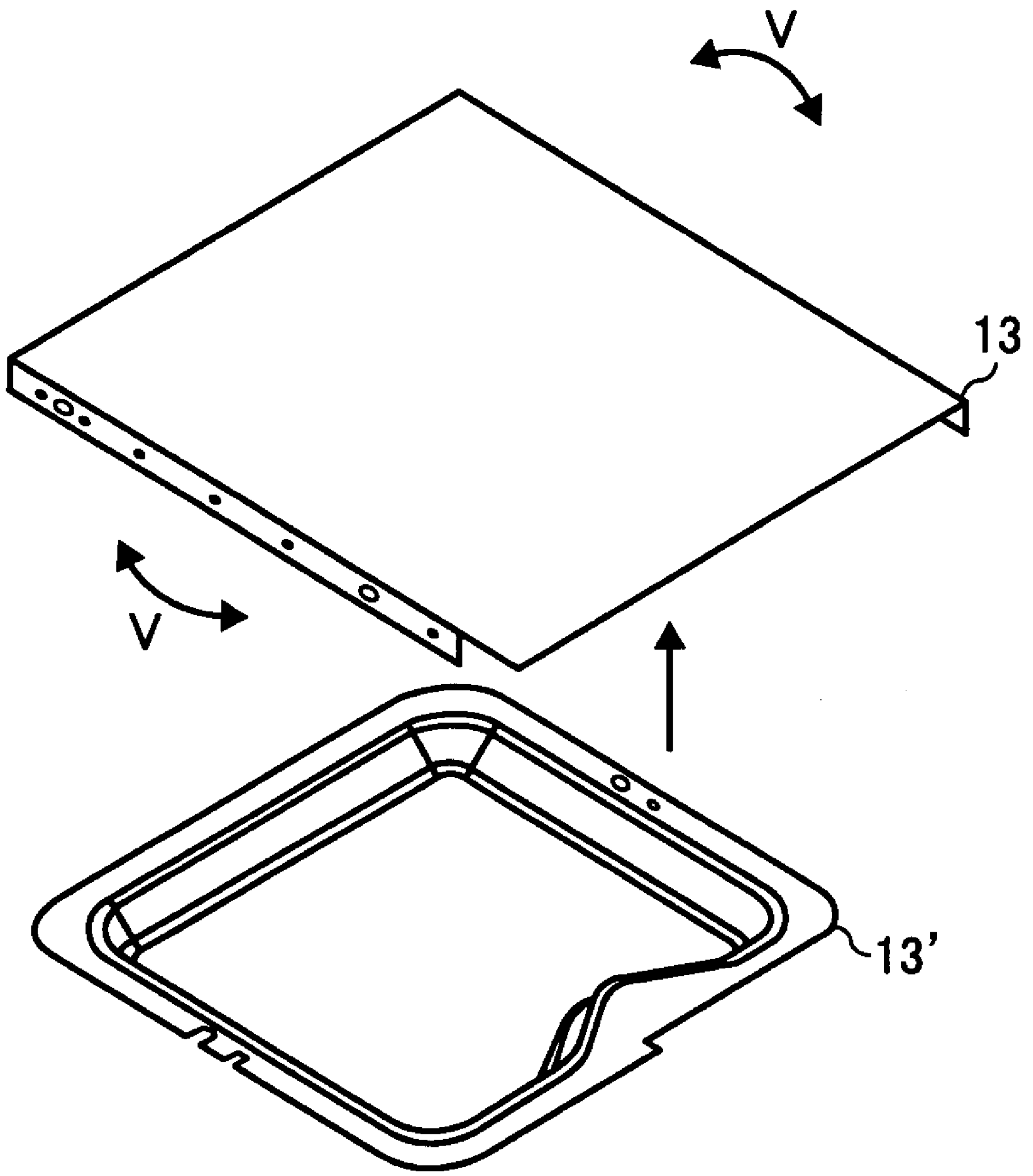
FIG. 15 is a perspective view of a member used for a support mechanism of the stay member used in the frame shown in FIG. 8.

FIG. 15 is a schematic diagram of this structure. A stay supporting member 13' is integrally provided in the bottom of the stay member 13. The stay supporting member 13' can enhance the second moment of area by increasing its dimension in the vertical direction through a drawing process.

In the present embodiment, the rigidity of the stay member 13 can be enhanced by using the stay supporting member in addition to the backing member 14. Therefore, the deformation of the stay member 13 due to external force is prevented and the side plates 11 and 12 connected to each other through the stay member 13 is prevented from falling down to each other. Thus, it is possible to prevent occurrence of displacement of the objects to be supported.

As set forth hereinabove, according to an embodiment of the present invention, displacement between side plates can be prevented, and the state where there is no displacement between the side plates can be maintained.

Less external force is transmitted to a stay member, and torsion of the stay member is prevented, which can prevent occurrence of distortion in the side plates connected to the stay member. Accordingly, displacement between the side plates can be corrected, and thus occurrence of an error in an image can be prevented.

Moreover, displacement prevention can be achieved by a simple structure including a convex portion such as a boss and a hole in which the convex portion is fitted. Besides, it is possible to prevent a fastened position from being largely displaced due to external force by even a small amount of pivotal movement of a connecting member.

Furthermore, a facing relationship between the side plates is defined based on the position where a device or a member is jig plates, and then the connecting member can be fixed to the side plates. Thus, even if there is an error in a fixed position on the connecting member, the connecting member is adjusted and fixed to fixing positions on the side plates.

Moreover, by fastening the connecting member laterally provided between the side plates to the side plates, the positional accuracy between the side plates and the device or the member directly supported thereby can be ensured. Thus, it is possible to prevent occurrence of an abnormal image due to the displacement.

Furthermore, the side plates and the connecting member laterally provided therebetween are provided in the loose-fitting state. Therefore, the position where the device or the member is attached is set based on the attachment of the device or the member without restricting the positional relationship due to the fastening of the connecting member. Thus, the device or the member can be supported without displacement.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A frame that constitutes an apparatus comprising:
- a first side plate;
- a second side plate that faces the first side plate; and
- a connecting member that is located between the first side plate and the second side plate, and that is supported by the first side plate and the second side plate at a first side and a second side, respectively, wherein
- the first side plate and the second side plate are configured to be attached with a component of the apparatus;
- the connecting member includes a first-side connecting portion on the first side and a second-side connecting portion on the second side,
- the first-side connecting portion is connected to the first side plate so that the first side plate does not move with respect to the connecting member,
- the second-side connecting portion includes a first connecting portion and a second connecting portion,
- the second side plate moves with respect to the connecting member on a second-connecting-portion side with the first connecting portion as a center, and
- the first side plate and the second side plate are attached with a cover member that is selectably positionable between an open position and a closed position.

2. The frame according to claim 1, wherein
- a direction perpendicular to an upright direction of the first side plate and the second side plate in a same plane is a front-to-rear direction of the apparatus,
- the cover member is located on front side of the apparatus, and
- the first connecting portion is located on front side with respect to the second connecting portion.

3. The frame according to claim 2, wherein
- the first-side connecting portion includes a third connecting portion and a fourth connecting portion, and
- the fourth connecting portion is located rear side with respect to the third connecting portion, and is an elongated hole extending in the front-to-rear direction.

4. The frame according to claim 3, wherein
- the first connecting portion and the third connecting portion are concave portions in an identical size,
- the first side plate includes a third convex portion corresponding to the third connecting portion, and a fourth convex portion corresponding to the fourth connecting portion, and
- the second side plate includes a first convex portion corresponding to the first connecting portion, and a second convex portion corresponding to the second connecting portion.

5. The frame according to claim 4, wherein
- the first convex portion, the second convex portion, the third convex portion, and the fourth convex portion are bosses, and
- the first connecting portion, the second connecting portion, the third connecting portion, and the fourth connecting portion are holes.

6. The frame according to claim 4, further comprising a backing member that is integrally provided between the first side plate and the second side plate in non-parallel to the connecting member on one side in the front-to-rear direction.

7. The frame according to claim 4, wherein
- the second connecting portion differs in size from the second convex portion in the upright direction and the front-to-rear direction, and
- size difference in the front-to-rear direction is larger than size difference in the upright direction.

8. The frame according to claim 2, further comprising a backing member that is integrally provided between rear sides of the first side plate and the second side plate in non-parallel to the connecting member.

9. The frame according to claim 1, wherein the cover member exposes, when in the open position, inside the apparatus.

10. The frame according to claim 1, wherein the first side plate and the second side plate each include a positioning and holding member on a surface facing the other side plate to position and hold the component of the apparatus between the first side plate and the second side plate.

11. An electronic device comprising the frame according to claim 1.

12. A frame assembly method for assembling the frame that constitutes the apparatus according to claim 1, wherein the first and second side plates of the frame each include a positioning and holding member on a surface facing the other side plate to position and hold the component of the apparatus between the first and second side plates, the frame assembly method comprising:
- fitting the connecting member between the first and second side plates so that the connecting member is supported by the first and second side plates;
- fixing one side of the connecting member to one of the first and second side plates;
- attaching the component to the positioning and holding member of each of the first and second side plates which are connected to each other in a loose-fitting state; and
- fastening and fixing the connecting member to the first and second side plates.

13. An image forming apparatus comprising a frame that constitutes an apparatus and includes:
- a first side plate;
- a second side plate that faces the first side plate; and
- a connecting member that is located between the first side plate and the second side plate, and that is supported by the first side plate and the second side plate at a first side and a second side, respectively, wherein the first side plate and the second side plate are configured to be attached with a component of the apparatus;

the connecting member includes a first-side connecting portion on the first side and a second-side connecting portion on the second side, the first-side connecting portion is connected to the first side plate so that the first side plate does not move with respect to the connecting member, the second-side connecting portion includes a first connecting portion and a second connecting portion, the second side plate moves with respect to the connecting member on a second-connecting-portion side with the first connecting portion as a center, and the first side plate and the second side plate are attached with a cover member that is selectably positionable between an open position and a closed position.

14. The image forming apparatus according to claim 13, wherein the first side plate and the second side plate each include a positioning and holding member on a surface facing the other side plate, the image forming apparatus further comprising:

an image carrier that is attached to the positioning and holding member.

15. The image forming apparatus according to claim 14, further comprising a transfer member between the first side plate and the second side plate, wherein the positioning and holding member defines positional relationship between the transfer member and the image carrier.

* * * * *